(12) United States Patent
Park et al.

(10) Patent No.: US 8,432,862 B2
(45) Date of Patent: Apr. 30, 2013

(54) METHOD FOR TRANSMITTING AND RECEIVING DATA USING PILOT STRUCTURE

(75) Inventors: Sung Ho Park, Seoul (KR); Jin Young Chun, Seoul (KR); Jin Soo Choi, Seoul (KR); Hyun Soo Ko, Seoul (KR); Bin Chul Ihm, Anyang-si (KR); Wook Bong Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 12/922,822

(22) PCT Filed: Apr. 16, 2009

(86) PCT No.: PCT/KR2009/001963
§ 371 (c)(1),
(2), (4) Date: Sep. 15, 2010

(87) PCT Pub. No.: WO2009/128657
PCT Pub. Date: Oct. 22, 2009

(65) Prior Publication Data
US 2011/0019635 A1 Jan. 27, 2011

Related U.S. Application Data

(60) Provisional application No. 61/045,280, filed on Apr. 16, 2008, provisional application No. 61/074,155, filed on Jun. 20, 2008.

(30) Foreign Application Priority Data

Oct. 16, 2008 (KR) .......................... 10-2008-0101649

(51) Int. Cl.
*H04W 4/00* (2009.01)

(52) U.S. Cl.
USPC .......................................................... 370/329

(58) Field of Classification Search .................. 370/203, 370/204–215, 216–228, 229–240, 241–253, 370/254–271, 310–337, 338–350, 351–394, 370/395.1, 395.3, 395.4, 395.41, 395.42, 370/395.5, 395.52, 395.53, 412–421, 431–457, 370/458–463, 464–497, 498–522, 523–520, 370/521–529
See application file for complete search history.

(56) References Cited

U.S. PATENT DOCUMENTS

| | | | |
|---|---|---|---|
| 7,436,757 B1 * | 10/2008 | Wilson et al. ................. 370/203 |
| 8,199,843 B2 * | 6/2012 | Kwak et al. .................... 375/267 |
| 2003/0072254 A1 * | 4/2003 | Ma et al. ........................ 370/208 |
| 2005/0243939 A1 | 11/2005 | Jung et al. | |

(Continued)

*Primary Examiner* — Jung-Jen Liu
(74) *Attorney, Agent, or Firm* — McKenna Long & Aldridge LLP

(57) ABSTRACT

A method for efficiently transmitting and receiving data in a wireless access system and a pilot allocation structure for the same are provided. In one aspect of the present invention, a method for transmitting and receiving data in a wireless access system, the method including transmitting data using a resource block constructed taking into consideration channel estimation capabilities and data transfer rate, and receiving data using the resource block. Here, the resource block may have a 6×6 structure constructed with 6 OFDM symbols and 6 subcarriers, and one or more first pilot symbols may be allocated to prescribed OFDM symbols of a first subcarrier and a fifth subcarrier of the resource block. Moreover, the first pilot symbols may be allocated to the resource block at a predetermined allocation rate taking into consideration a number of transmit antennas.

12 Claims, 22 Drawing Sheets

U.S. PATENT DOCUMENTS

| | | |
|---|---|---|
| 2006/0067205 A1* | 3/2006 | Jung et al. .................... 370/203 |
| 2006/0120270 A1 | 6/2006 | Han et al. |
| 2006/0172704 A1* | 8/2006 | Nishio et al. ............... 455/67.11 |
| 2006/0209732 A1 | 9/2006 | Gorokhov et al. |
| 2006/0280255 A1 | 12/2006 | Hongming et al. |
| 2007/0258373 A1 | 11/2007 | Frederiksen et al. |
| 2007/0297381 A1 | 12/2007 | Oketani et al. |
| 2008/0032630 A1 | 2/2008 | Kim et al. |
| 2008/0205337 A1 | 8/2008 | Hsiao et al. |
| 2008/0247488 A1* | 10/2008 | Li et al. ......................... 375/299 |
| 2009/0067534 A1* | 3/2009 | Kwak et al. .................... 375/267 |
| 2009/0225722 A1 | 9/2009 | Cudak et al. |
| 2009/0257520 A1 | 10/2009 | Lin et al. |
| 2010/0172427 A1* | 7/2010 | Kleider et al. ................ 375/260 |
| 2010/0284488 A1* | 11/2010 | Murakami et al. ............. 375/295 |
| 2011/0149942 A1* | 6/2011 | Ko et al. ....................... 370/343 |

* cited by examiner

|   | 0 | 1 | 2 | 3 | 4 | 5 |
|---|---|---|---|---|---|---|
| 0 |   |   |   |   |   |   |
| 1 | 1 | 2 |   |   | 1 | 2 |
| 2 |   |   |   |   |   |   |
| 3 |   |   |   |   |   |   |
| 4 | 2 | 1 |   |   | 2 | 1 |
| 5 |   |   |   |   |   |   |

(a)

|   | 0 | 1 | 2 | 3 | 4 | 5 |
|---|---|---|---|---|---|---|
| 0 |   |   |   |   |   |   |
| 1 |   | 1 |   |   | 2 |   |
| 2 |   |   | 2 |   |   | 1 |
| 3 |   |   |   |   |   |   |
| 4 |   | 1 |   |   | 2 |   |
| 5 |   | 2 |   |   | 1 |   |

METHOD FOR TRANSMITTING AND RECEIVING DATA USING PILOT STRUCTURE

This application claims the benefit of U.S. Provisional Application Nos. 61/045,280 filed on Apr. 16, 2008 and 61/074,155 filed on Jun. 20, 2008, Korean Patent Application No. 10-2008-0101649 filed on Oct. 16, 2008 and PCT Application No. PCT/KR2009/001963 filed on Apr. 16, 2009, all of which are incorporated by reference in their entirety herein.

TECHNICAL FIELD

The present invention relates to a method for efficiently transmitting and receiving data in a wireless access system and a pilot subcarrier allocation structure for efficient data transmission.

BACKGROUND ART

The following is a brief description of a channel estimation method and pilot signals.

To detect a synchronous signal, a receiver should have information regarding wireless channels such as attenuation, phase shift, or time delay. Here, the term "channel estimation" refers to estimation of the reference phase and the size of each carrier. Wireless channel environments have fading characteristics such that the condition of a channel irregularly changes in the time and frequency domains as time passes. Channel estimation serves to estimate the amplitude and phase of such a channel. Namely, channel estimation serves to estimate a frequency response of a wireless link or a wireless channel.

In one channel estimation method, a reference value is estimated based on pilot symbols of several base stations using a two-dimensional channel estimator. Here, the term "pilot symbols" refers to symbols that do not contain actual data but instead have high power to support carrier phase synchronization and acquisition of base station information. The transmitting and receiving ends can perform channel estimation using such pilot symbols. Specifically, the transmitting and receiving ends estimate a channel using pilot symbols known to both the transmitting and receiving ends and reconstruct data using the estimated value.

FIG. 1 illustrates an example of a general pilot structure used in a single-transmit-antenna structure.

The pilot structure of FIG. 1 is applied when one transmit antenna is used. When one antenna is used, two pilot subcarriers are used for each even symbol and two pilot subcarriers are used for each odd symbol. In this case, an overhead of about 14.28% may occur due to pilot subcarriers.

FIG. 2 illustrates an example of a general pilot structure used in a two-transmit-antenna structure.

In downlink, Space-Time Coding (STC) is used to provide high-order transmit diversity. Here, two or more transmit antennas are needed to support STC.

As shown in FIG. 2, two transmit antennas (first and second antennas) can simultaneously transmit different data symbols. Here, data symbols are repeatedly transmitted in the time domain (space-time) and the frequency domain (space-frequency). Accordingly, the pilot structure of FIG. 2 can exhibit higher capabilities when transmitting data although receiver complexity is increased.

The method of allocating data in the example of FIG. 2 can be changed in order to use two antennas having the same channel estimation capabilities. A respective pilot symbol is transmitted twice through each antenna. The position of the pilot symbol is changed over four symbol durations. Symbols are counted starting from the beginning of the current region, and the first symbol number is even.

In the example of FIG. 2, pilot subcarriers are used for channel estimation. Here, an overhead of about 14.28% may occur due to pilot subcarriers.

FIG. 3 illustrates an example of a general pilot structure used in a four-transmit-antenna structure.

When four antennas (first, second, third, and fourth antennas) are used, transmit diversity can be improved, compared to when two antennas are used. Even when four antennas are used, the pilot structure of FIG. 3 can exhibit the same channel estimation capabilities as when two transmit antennas are used.

As shown in FIG. 3, respective pilot channels of the antennas are allocated to each symbol. For example, when one symbol includes 14 subchannels, respective pilots of the four antennas are allocated to subcarriers of each symbol. Thus, an overhead of about 28.57% may occur due to pilot subcarriers.

As described above, an overhead of about 14.28% may occur due to pilot subcarriers when one transmit antenna is used and when two transmit antennas are used. In addition, an overhead of about 28.57% may occur due to pilot subcarriers when four transmit antennas are used.

DISCLOSURE

Technical Problem

Permutation methods that are generally used include Partial Usage of Subchannel (PUSC), Full Usage of Subchannel (FUSC), and Adaptive Modulation and Coding (AMC). The permutation methods may use different pilot subcarrier allocation structures.

This is because different optimal structures can be defined for the permutation methods since the permutation methods are separated in time. A unified basic data allocation structure is required when the permutation methods are present together in time.

It can be seen from FIGS. 1 to 3 that significant overhead occurs due to pilot subcarriers in the conventional Orthogonal Frequency Division Multiplexing (OFDM) system. Such pilot overhead may reduce link throughput, thereby causing a reduction in system capabilities. The conventional pilot structures have a problem in that they do not maintain commonality between a plurality of antennas in a multiple-antenna system. Thus, conventional pilot structures have a problem in that transfer rate is reduced when pilot overhead is significant.

An object of the present invention devised to solve the problems lies on providing a method for efficiently transmitting data.

Another object of the present invention devised to solve the problem lies on providing a pilot subcarrier allocation structure that can be applied to a system having multiple transmit antennas in order to increase data transfer rate.

A further object of the present invention devised to solve the problem lies on providing a data allocation structure unified for a variety of permutation methods.

A further object of the present invention devised to solve the problem lies on providing methods of minimizing interferences with neighbor base stations by cyclically shifting or position shifting prescribed pilot allocation structures satisfying the above objects and using the shifted pilot allocation structures.

Technical Solution

To achieve the objects of the present invention, the present invention provides a method for efficiently transmitting data in a wireless access system. The present invention also provides a pilot allocation structure for efficient data transmission.

In one aspect of the present invention, a method for transmitting and receiving data in a wireless access system, the method including transmitting data using a resource block constructed taking into consideration channel estimation capabilities and data transfer rate, and receiving data using the resource block. Here, the resource block may have a 6×6 structure constructed with 6 OFDM symbols and 6 subcarriers, and one or more first pilot symbols may be allocated to prescribed OFDM symbols of a first subcarrier and a fifth subcarrier of the resource block. Moreover, the first pilot symbols may be allocated to the resource block at a predetermined allocation rate taking into consideration a number of transmit antennas.

The first pilot symbols may be allocated to a first OFDM symbol and a fifth OFDM symbol of the first subcarrier and to a second OFDM symbol and a sixth OFDM symbol of the fifth subcarrier.

The resource block may include second pilot symbols generated by shifting each of the first pilot symbols on a 1 subcarrier basis.

The resource block may include the first pilot symbols and the second pilot symbols.

The first pilot symbols may be allocated at intervals of 2 OFDM symbols or at intervals of 3 OFDM symbols taking into consideration a coherent time of a moving speed of a terminal.

The predetermined allocation rate of the first pilot symbols may have a range of substantially 11.11%.

The predetermined allocation rate of the pilot symbols may have a range of substantially 22.22%.

For boosting power of the first pilot symbols and the second pilot symbols respectively, power may be borrowed from at least one data symbol included in each OFDM symbol to which the first pilot symbols and the second pilot symbols are allocated.

The transmit antenna may support, as a multiple-antenna transmission scheme, at least one of Spatial Frequency Block Coding (SFBC), Spatial Time Block Coding (STBC), and Spatial Multiplexing (SM).

When the transmit antenna supports SFBC, the pilot symbols may be located adjacent to each other in a frequency domain.

When the transmit antenna supports STBC, the pilot symbols may be located adjacent to each other in a time domain.

The first pilot symbols may be cyclically shifted on a prescribed OFDM symbol basis.

The first pilot symbols may be cyclically shifted on a prescribed subcarrier basis.

At least one of the pilot symbols may be allocated to each edge of the resource block.

The pilot symbols may perform position shift within a prescribed region located at each edge of the resource block.

The prescribed region may have a 2×2 structure established from each edge of the resource block.

When the first pilot symbols are used for a first antenna and the second pilot symbols are used for a second antenna, the first antenna and the second antenna may be discriminated using different codes.

When the first pilot symbols are used for a second antenna and the second pilot symbols are used for a first antenna, the first antenna and the second antenna are discriminated using different codes.

When a first user and a second user perform collaborative transmission using one or more transmit antennas, the first and second users may be discriminated using different codes.

When a first user and a second user perform collaborative transmission, the first user and the second user may use the first pilot symbols. Here, the first user and the second user may be discriminated using different codes.

When a first user and a second user perform collaborative transmission using the resource block, the first pilot symbols and the second pilot symbols may be multiplexed using different antenna indices for the first user and the second user.

When a first user and a second user perform collaborative transmission using the resource block, the first pilot symbols and the second pilot symbols may be multiplexed using both different antenna indices for the first and second users and codes for the first and second users.

Advantageous Effects

The embodiments of the present invention have the following advantages.

First, if the pilot allocation structures described in the embodiments of the present invention are used, it is possible to efficiently transmit and receive data.

Second, if the pilot allocation structures described in the embodiments of the present invention are used, it is possible to use a unified data allocation structure for a variety of permutation methods.

Third, if the pilot allocation structures described in the embodiments of the present invention are used, systems which use the same permutation mode at the same time can use a unified pilot allocation structure without using different pilot allocation schemes according to resource allocation methods.

Fourth, the embodiments of the present invention can efficiently reduce pilot subcarrier overhead, thereby increasing data transfer rate.

Fifth, the spirit of the present invention can be applied to any system that uses multiple transmit/receive antennas.

Sixth, channel estimation capabilities of pilot symbols can be improved by location shifting the pilot symbols within a prescribed region of a resource block.

DESCRIPTION OF DRAWINGS

The accompanying drawings, which are included to provide a further understanding of the invention, illustrate embodiments of the invention and together with the description serve to explain the principle of the invention.

In the drawings:

FIG. 4 illustrates an example of pilot allocation structures according to one embodiment of the present invention.

FIG. 5 illustrates another example of pilot allocation structures according to one embodiment of the present invention.

FIG. 6 illustrates further example of pilot allocation structures according to one embodiment of the present invention.

FIG. 7 illustrates still further example of pilot allocation structures according to one embodiment of the present invention.

FIG. 8 illustrates still further example of pilot allocation structures according to one embodiment of the present invention.

FIG. 9 illustrates still further example of pilot allocation structures according to one embodiment of the present invention.

FIG. 10 illustrates still further example of pilot allocation structures according to one embodiment of the present invention.

FIG. 11 illustrates still further example of pilot allocation structures according to one embodiment of the present invention.

FIG. 12 illustrates still further example of pilot allocation structures according to one embodiment of the present invention.

FIG. 13 illustrates still further example of pilot allocation structures according to one embodiment of the present invention.

FIG. 14 illustrates still further example of pilot allocation structures according to one embodiment of the present invention.

FIG. 15 illustrates still further example of pilot allocation structures according to one embodiment of the present invention.

FIG. 16 illustrates still further example of pilot allocation structures according to one embodiment of the present invention.

FIG. 17 illustrates an example of new pilot allocation structures generated by cyclically shifting a prescribed pilot allocation structure according to another embodiment of the present invention.

FIG. 18 illustrates another example of new pilot allocation structures generated by cyclically shifting a prescribed pilot allocation structure according to another embodiment of the present invention.

FIG. 19 illustrates still further example of new pilot allocation structures generated by cyclically shifting a prescribed pilot allocation structure according to another embodiment of the present invention.

FIG. 20 illustrates still further example of new pilot allocation structures generated by cyclically shifting a prescribed pilot allocation structure according to another embodiment of the present invention.

FIG. 21 illustrates an exemplary method for shifting the locations of pilot symbols used in a single-transmit-antenna structure according to still further embodiment of the present invention.

FIG. 22 illustrates an exemplary method for shifting the locations of pilot symbols used in a two-transmit-antenna structure according to still further embodiment of the present invention.

MODE FOR INVENTION

Figure 1:
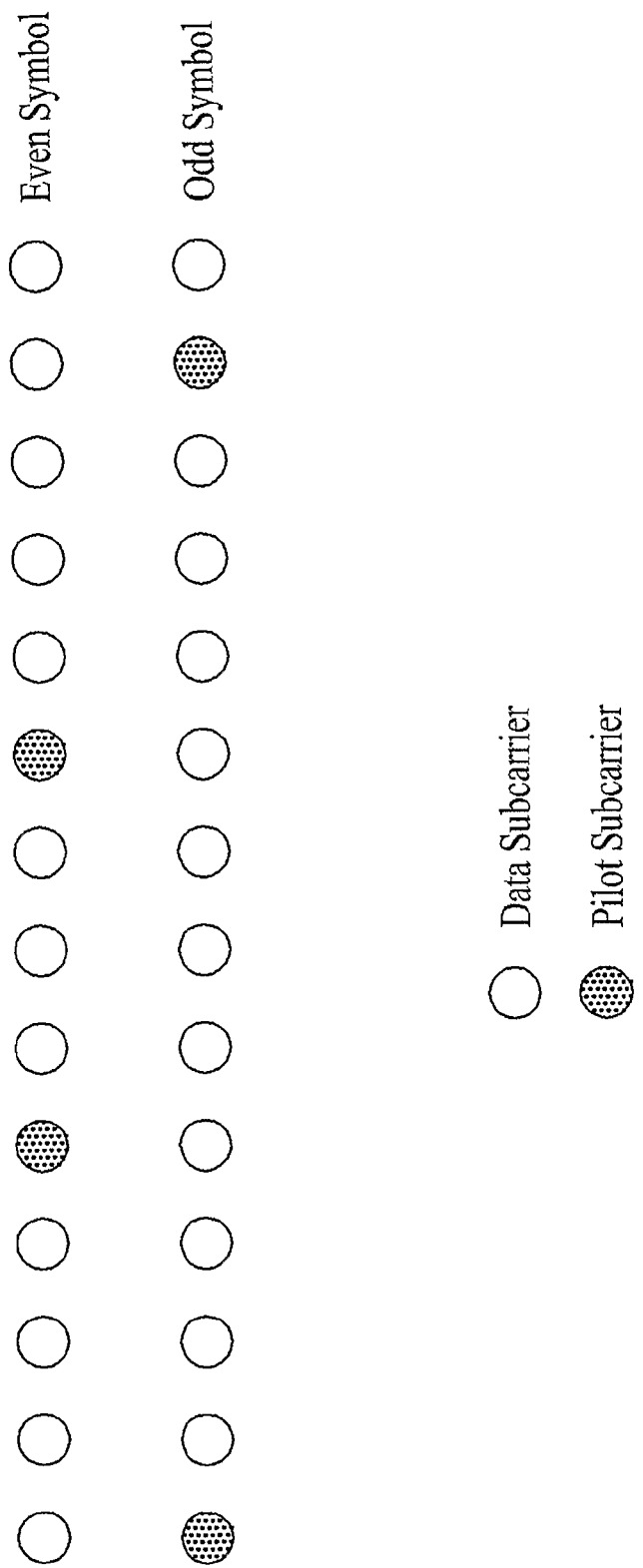
FIG. 1 illustrates an example of a general pilot structure used in a single-transmit-antenna structure.
Figure 2:
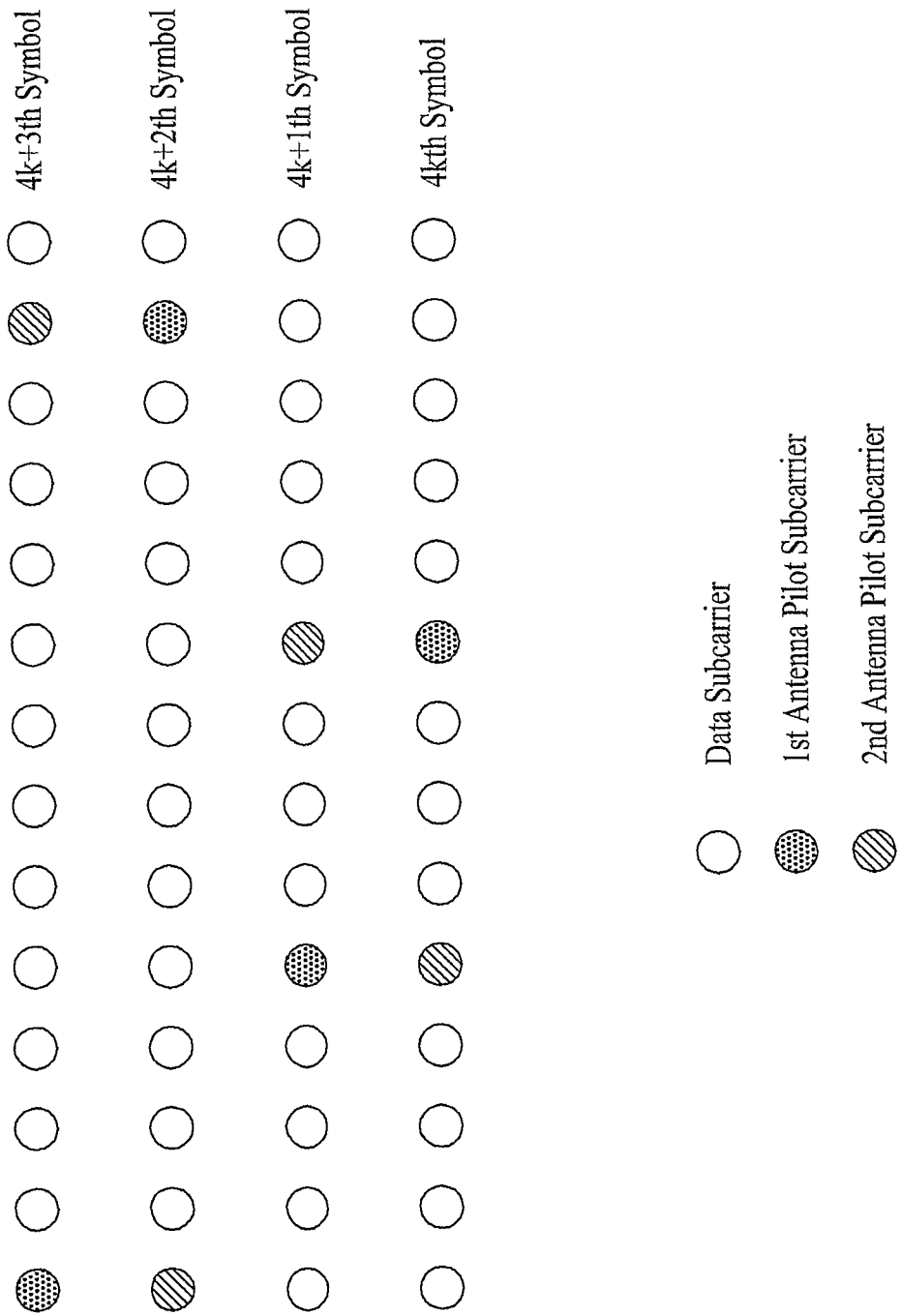
FIG. 2 illustrates an example of a general pilot structure used in a two-transmit-antenna structure.
Figure 3:
FIG. 3 illustrates an example of a general pilot structure used in a four-transmit-antenna structure.

The embodiments of the present invention provide a variety of methods for transmitting data using a pilot allocation structure in a wireless access system.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

In the following description made in conjunction with the drawings, procedures or steps that may obscure the subject matter of the present invention are not described and procedures or steps that will be apparent to those skilled in the art are also not described.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", or "access point". The terminal conceptually includes a Mobile Station (MS) and a stationary station. The term "terminal" may also be replaced with another term such as "User Equipment (UE)", "Subscriber Station (SS)", "Mobile Subscriber Station (MSS)", or "mobile terminal". The term "stationary terminal" may also be replaced with another term such as "notebook" or "laptop".

The term "transmitting end" refers to a node that transmits data or audio services and "receiving end" refers to a node that receives data or audio services. Thus, in uplink, the terminal may be a transmitting end and the base station may be a receiving end. Similarly, the terminal may be a receiving end and the base station may be a transmitting end.

A Personal Digital Assistant (PDA), a cellular phone, a Personal Communication Service (PCS) phone, a Global System for Mobile (GSM) phone, a Wideband CDMA (WCDMA) phone, or a Mobile Broadband System (MBS) phone may be used as the mobile terminal in the present invention.

The methods according to the embodiments of the present invention can be implemented by hardware, firmware, software, or any combination thereof.

In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents. Especially, the embodiments of the present invention can be supported by P802.16e-2005 or P802.16Rev2/D4 (April 2008), which are standard documents of the IEEE 802.16 system.

Specific terms used in the following description are provided for better understanding of the present invention and can be replaced with other terms without departing from the spirit of the present invention.

<Pilot Allocation Structures and Methods for Pilot Allocation>

Pilot allocation structures described in the embodiments of the present invention can be designed taking into consideration a variety of factors. The pilot allocation structures described in the embodiments of the present invention can be repeatedly applied in the time domain and the frequency domain in a frame or a subframe.

For example, the pilot allocation structures can be designed taking into consideration the intervals between pilot symbols in the time and frequency domains, the ratio of the amount of data transmission to pilot density, and the rate of power per symbol in consideration of power boosting. In the case where multiple antennas are used, it is possible to additionally take into consideration the ratio of power per symbol between antennas in consideration of power boosting and whether or not it is possible to efficiently support multiple-antenna transmission schemes.

The following is a detailed description of important factors that are taken into consideration when a pilot allocation structure is designed.

1. Pilot Symbol Allocation Interval

It is preferable that the interval between pilot symbols in pilot allocation structures according to the spirit of the present invention be maintained to be equal to or less than 2 or 3 symbols, taking into consideration a coherent time of the moving speed of the terminal (for example, 120 Km/h). It is also preferable that the interval between pilot symbols be maintained to be equal to or less than 4 to 6 subcarriers as an effective coherence bandwidth, taking into consideration frequency-selective characteristics. However, these requirements can be adjusted according to trade-off between channel estimation capabilities of pilots and data transfer rate.

2. Pilot Allocation Rate According to the Number of Transmit Antennas

In the embodiments of the present invention, the pilot allocation rate can be changed according to the number of transmit antennas. For example, it is preferable that pilots be allocated at a rate of about 11.11%-16.67% in a Resource Block (RB) when one transmit antenna is used and it is preferable that pilots be allocated at a rate of about 11.11%-22.22% in a Resource Block (RB) when two transmit antennas are used.

3. Power Boosting

In order to improve channel estimation capabilities of terminals, it is possible to take into consideration power boosting. For example, in order to boost pilot symbols, it is possible to take into consideration clipping or back-off based on boosted pilot power. In the case where clipping or back-off is taken into consideration, power loss due to clipping or back-off may cause a reduction in the capabilities of the terminal.

In order to boost pilot symbol power, it is possible to borrow data power through stealing or puncturing. In this case, the channel estimation capabilities can be improved. However, when the channel condition is poor, data processing capability may be reduced due to power loss of the data region. It is possible to select a most appropriate method from among the power boosting methods, taking into consideration a variety of factors such as channel environments or overall capabilities in various ways. If data symbol power is borrowed when pilot symbol power is boosted, this may not cause a power fluctuation per OFDM symbol.

However, if only the pilot symbol power is boosted without borrowing the data symbol power, this may cause the power fluctuation per OFDM symbol. In this case, the available maximum power of a Power Amplifier (PA) is set based on the boosted pilot power. Thus, there may be problems in that it is necessary to use an expensive PA with a relatively wide power range and the power efficiency of the PA is reduced.

Accordingly, in order to avoid the power fluctuation per OFDM symbol, it is preferable that power of the data region be borrowed through stealing or puncturing or that each OFDM symbols have the same number of pilots to make the power level of each symbol equal.

The embodiments of the present invention provide pilot allocation structures not only for a single transmit antenna but also for multiple transmit antennas. The pilot allocation structure for multiple transmit antennas may cause a difference between power levels of transmit antennas per OFDM symbol. Accordingly, in order to reduce the power difference between antennas, it is preferable that each OFDM symbol be designed so as to have pilot symbols of all antennas.

4. Multiple Antenna Transmission Scheme

Pilot allocation structures described in the embodiments of the present invention need to be able to efficiently support multiple-antenna transmission schemes. For example, when it is assumed that two or more transmit antennas are present, it is generally possible to take into consideration Spatial Frequency Block Coding (SFBC), Spatial Time Block Coding (STBC), Spatial Multiplexing (SM), and the like.

When channel estimation capabilities are taken into consideration, in the case of SFBC, a channel between two subcarriers coded for two antennas should be flat and, in the case of STBC, the flatter the channel between two coded symbols is, the greater the increase in data transmission capability. Accordingly, in the case where the communication system supports SFBC, it is preferable that pilots of two antennas be located adjacent to each other in the frequency domain. In addition, in the case where the communication system supports STBC, it is preferable that pilots of two antennas be located adjacent to each other in the time domain.

The embodiments of the present invention provide pilot allocation schemes according to the number of transmit antennas. Here, in a pilot allocation scheme of multiple transmit antennas, it is possible to apply a different pilot allocation structure to each antenna.

Pilot allocation structures illustrated in the present invention are basically designed taking into consideration both the case where a single transmit antenna is used and the case where two transmit antennas are used. However, in the case where four transmit antennas are used, it is possible to attach a specific code to a pilot allocation structure used for a pair of transmit antennas to discriminate it from that of the other pair of antennas. That is, even when a pilot structure for two transmit antenna is used, it is possible to support a pilot allocation structure for four transmit antennas. In addition, when it is assumed that collaborative Spatial Multiplexing (SM) or collaborative transmission is employed, it is possible to discriminate between respective pilot allocation structures of users using a specific code for each user.

Each pilot allocation structure described in the embodiments of the present invention can be applied to both uplink and downlink. The pilot allocation structure may be used for common pilots only and may also be used for dedicated pilots only. The pilot allocation structure may also be used for both the common and dedicated pilots.

A signal such as a control channel or a preamble can be carried in the pilot structure described in the embodiments of the present invention. Here, a pilot may not be carried only at positions of the pilot structure to which the control channel or preamble is allocated. In addition, a dedicated pilot may be allocated only at positions of the pilot structure to which the control channel or preamble is allocated. The embodiments of the present invention may also be applied to a pilot allocation structure for Multicast and Broadcast Service (MBS) data transmission.

In the accompanying drawings, the horizontal axis may represent a set of time domain OFDM symbols and the vertical axis may represent frequency domain subcarriers. Moreover, in the embodiments of the present invention, a pilot allocation region (e.g. Resource Block) is a two-dimensional region and may have a structure of a 6×6 basis. However, since the pilot allocation region is a virtual region, it can be reduced or expanded according to a system configuration or user requirements.

For example, a 6×6 pilot structure may be an expanded form of a 3×3 pilot structure basically. Accordingly, respective pilot structures of the embodiments of the present invention can be expanded on a 3N×3M (N, M: integer number) basis. In the embodiments of the present invention, it is preferable that using a 6×6 structure than an 18×2 as a basic resource allocation region structure when robustness to frequency-selective characteristics is required.

In the embodiments of the present invention, pilot structures are designed to have a good power efficiency considering the power fluctuation per OFDM symbol when a pilot density of 11.11% is considered.

It is preferable that channel estimation in a single region is considered due to characteristics of a dedicated pilot for uplink. In this case, it is preferable that pilot symbols are allocated to each edge of a resource block. Also, when frequency-selective characteristics and channel estimation capabilities at a high speed are considered, the pilot symbols may be allocated up to a length of one symbol or one subcarrier apart from each edge of a specific resource block.

Moreover, by raising the rate of pilot symbol allocation in a specific resource block, channel estimation capabilities of the pilots can be improved. For example, pilot structures in the embodiments of the present invention are suitable for the case where higher channel estimation capabilities are required by raising the rate of pilot symbol allocation in an RB to 16.16%.

Furthermore, in the case where the number of transmit antennas is increased, the rate of pilot symbol allocation in an RB can be increased. In the embodiment of the present invention, the rate of pilot symbol can be set to 22.22% in a specific resource block when two transmit antennas are used. Also, a 11.11% rate of pilot symbol allocation can be applied to a specific resource block when two transmit antennas are used. This is suitable for the case where a high data transfer rate is required and an overall channel status is not changing in the resource block. Pilot structures can be configured relatively suitable for an SM by designing the pilot structures considering relatively high channel estimation capabilities.

Each pilot allocation structure used in the embodiments of the present invention described below can be represented on an RB basis. Here, the vertical axis of the pilot allocation structure may represent a subcarrier index "m" as the frequency domain and the horizontal axis may represent an OFDM symbol index "n" as the time domain. The embodiments of the present invention can support a multiple-antenna system.

Here, an RE to which a pilot symbol of the first transmit antenna is allocated is denoted by "1" and an RE to which a pilot symbol of the second transmit antenna is allocated is denoted by "2". However, also the pilot symbol of the first transmit antenna can be allocated to an RE denoted by "2" and the pilot symbol of the second transmit antenna can be allocated to an RE denoted by "1". Unnoted REs are those for data transmission.

In the embodiments of the present invention, pilot structures designed for 2 or more transmit antennas may be used in a system which uses one transmit antenna. Here, pilot symbols for one transmit antenna can be allocated to either the pilot symbols denoted by "1" or the pilot symbols denoted by "2".

In the embodiments of the present invention, the term "transmit antenna" may mean a physical antenna. However, the transmit antenna may also mean a stream or a layer which can be transmitted through the antenna. Therefore, the term "transmit antenna" can be replaced by "stream" or "layer".

In the embodiments of the present invention, in the case where terminals, each having one transmit antenna, perform collaborative Spatial Multiplexing (SM) or collaborative transmission, it is possible to discriminate between the terminals using different antenna indices or alternatively using both different antenna indices and corresponding codes.

Figure 4:
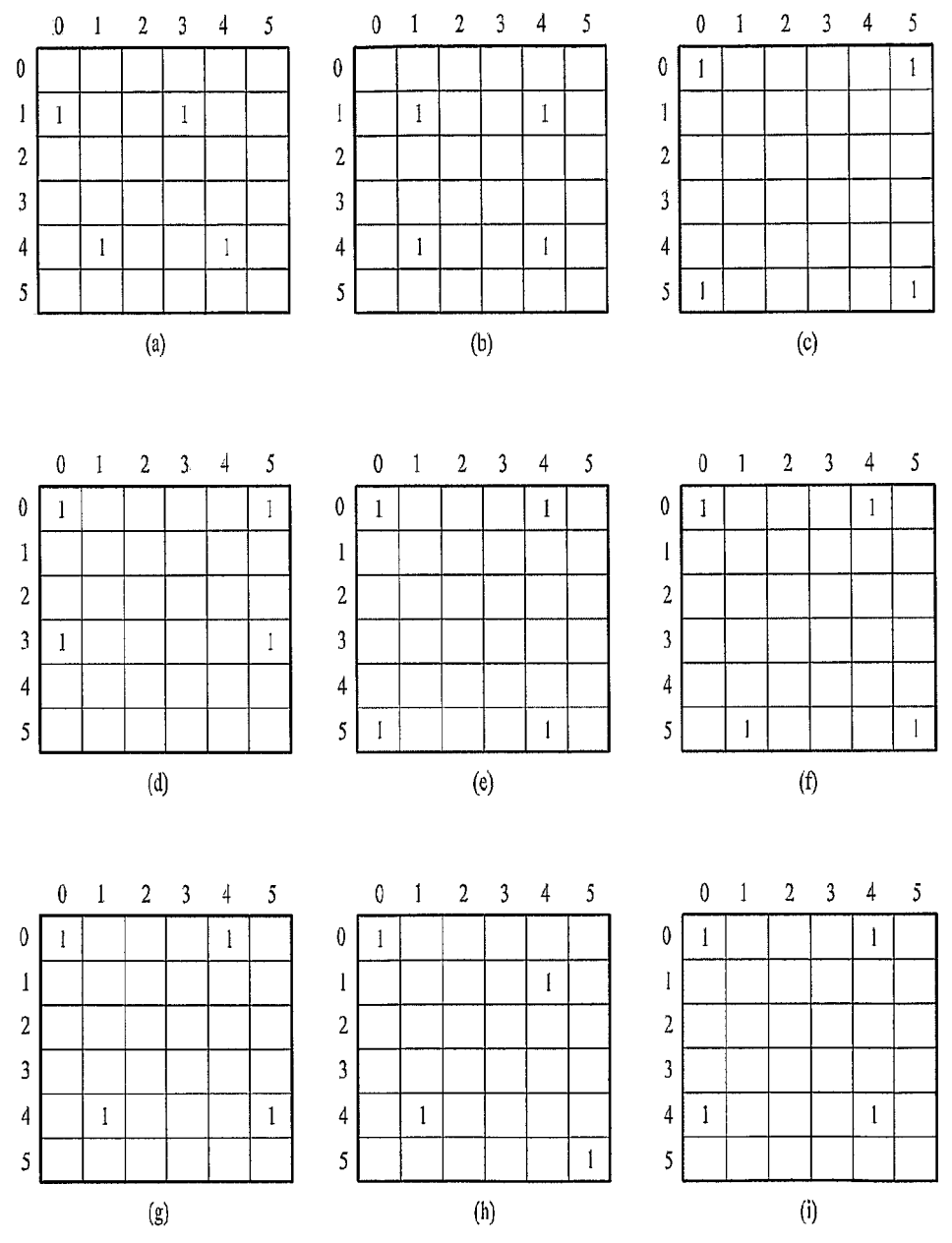

FIG. 4 illustrates an example of pilot allocation structures according to one embodiment of the present invention.

Specifically, FIG. 4 illustrates pilot allocation structures in the case where the number of transmit antennas is 1, each RB has a 6×6 structure, and the rate of pilot symbol allocation in an RB is about 11.11%.

In the pilot allocation structure of FIG. 4(a), in the subcarrier index m of 1, pilot symbols can be allocated to positions having OFDM symbol indices n of 0 and 3. In the pilot allocation structure of FIG. 4(b), in the subcarrier indices m of 1 and 4, pilot symbols can be allocated to positions having OFDM symbol indices n of 1 and 4. In the pilot allocation structure of FIG. 4(b), in the subcarrier indices m of 0 and 5, pilot symbols can be allocated to positions having OFDM symbol indices n of 0 and 5.

In the pilot allocation structure of FIG. 4(d), in the subcarrier indices m of 0 and 3, pilot symbols can be allocated to positions having OFDM symbol indices n of 0 and 5. In the pilot allocation structure of FIG. 4(e), in the subcarrier indices m of 0 and 5, pilot symbols can be allocated to positions having OFDM symbol indices n of 0 and 4. In the pilot allocation structure of FIG. 4(f), in the first subcarrier (m=0), pilot symbols can be allocated to positions having OFDM symbol indices n of 0 and 4. In the sixth subcarrier (m=5), pilot symbols can be allocated to positions having OFDM symbol indices n of 1 and 5.

In the pilot allocation structure of FIG. 4(g), in the first subcarrier (m=0), pilot symbols can be allocated to positions having OFDM symbol indices n of 0 and 4. In the fifth subcarrier (m=4), pilot symbols can be allocated to positions having OFDM symbol indices n of 1 and 5. In the pilot allocation structure of FIG. 4(h), in the first subcarrier (m=0), pilot symbols can be allocated to positions having OFDM symbol index n of 0 and in the second subcarrier (m=1), pilot symbols can be allocated to positions having OFDM symbol index n of 4. In the fifth subcarrier (m=4), pilot symbols can be allocated to positions having OFDM symbol index n of 1, and in the sixth subcarrier (m=5), pilot symbols can be allocated to positions having OFDM symbol index n of 5. In the pilot allocation structure of FIG. 4(i), in the subcarrier indices m of 0 and 4, pilot symbols can be allocated to positions having OFDM symbol indices n of 0 and 4.

Figure 5:
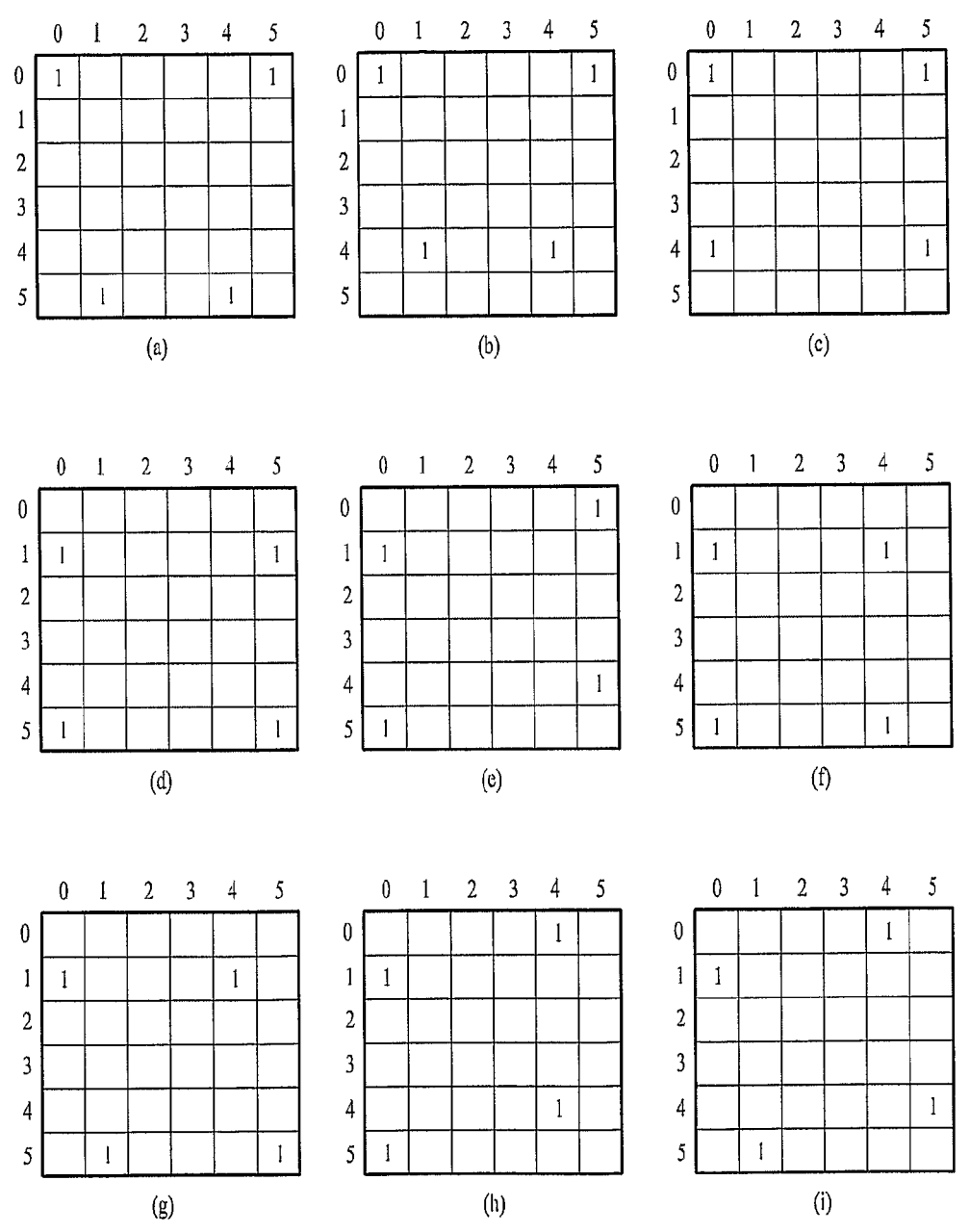

FIG. 5 illustrates another example of pilot allocation structures according to one embodiment of the present invention.

Specifically, FIG. 5 illustrates pilot allocation structures in the case where the number of transmit antennas is 1, each RB has a 6×6 structure, and the rate of pilot symbol allocation in an RB is about 11.11%.

In the pilot allocation structure of FIG. 5(a), in the first subcarrier (m=0), pilot symbols can be allocated to positions having OFDM symbol indices n of 0 and 5. In the sixth subcarrier (m=5), pilot symbols can be allocated to positions having OFDM symbol indices n of 1 and 4. In the pilot allocation structure of FIG. 5(b), in the first subcarrier (m=0), pilot symbols can be allocated to positions having OFDM symbol indices n of 0 and 5. In the fifth subcarrier (m=4), pilot symbols can be allocated to positions having OFDM symbol indices n of 0 and 5. In the pilot allocation structure of FIG. 5(c), in the first subcarrier (m=0), pilot symbols can be allocated to positions having OFDM symbol indices n of 0 and 5. In the fifth subcarrier (m=5), pilot symbols can be allocated to positions having OFDM symbol indices n of 0 and 5.

In the pilot allocation structure of FIG. 5(d), in the subcarrier indices m of 1 and 5, pilot symbols can be allocated to positions having OFDM symbol indices n of 0 and 5. In the pilot allocation structure of FIG. 5(e), in the first OFDM symbol (n=0), pilot symbols can be allocated to positions having subcarrier indices m of 1 and 5. In the sixth OFDM symbol (n=5), pilot symbols can be allocated to positions having subcarrier indices m of 0 and 4. In the pilot allocation structure of FIG. 5(f), in the subcarrier indices m of 1 and 5, pilot symbols can be allocated to positions having OFDM symbol indices n of 0 and 4.

In the following description made in conjunction with the drawings, the OFDM symbol index n and subcarrier index m of an RB can be expressed by a coordinate form of (n, m).

In the pilot allocation structure of FIG. 5(g), pilot symbols can be allocated to resource elements having coordinates (0,1), (4,1), (1,5) and (5,5). In the pilot allocation structure of FIG. 5(h), pilot symbols can be allocated to resource elements having coordinates (0,1), (4,0), (5,0) and (4,4). In the pilot allocation structure of FIG. 5(i), pilot symbols can be allocated to resource elements having coordinates (0,1), (1,5), (4,0) and (5,4).

Figure 6:
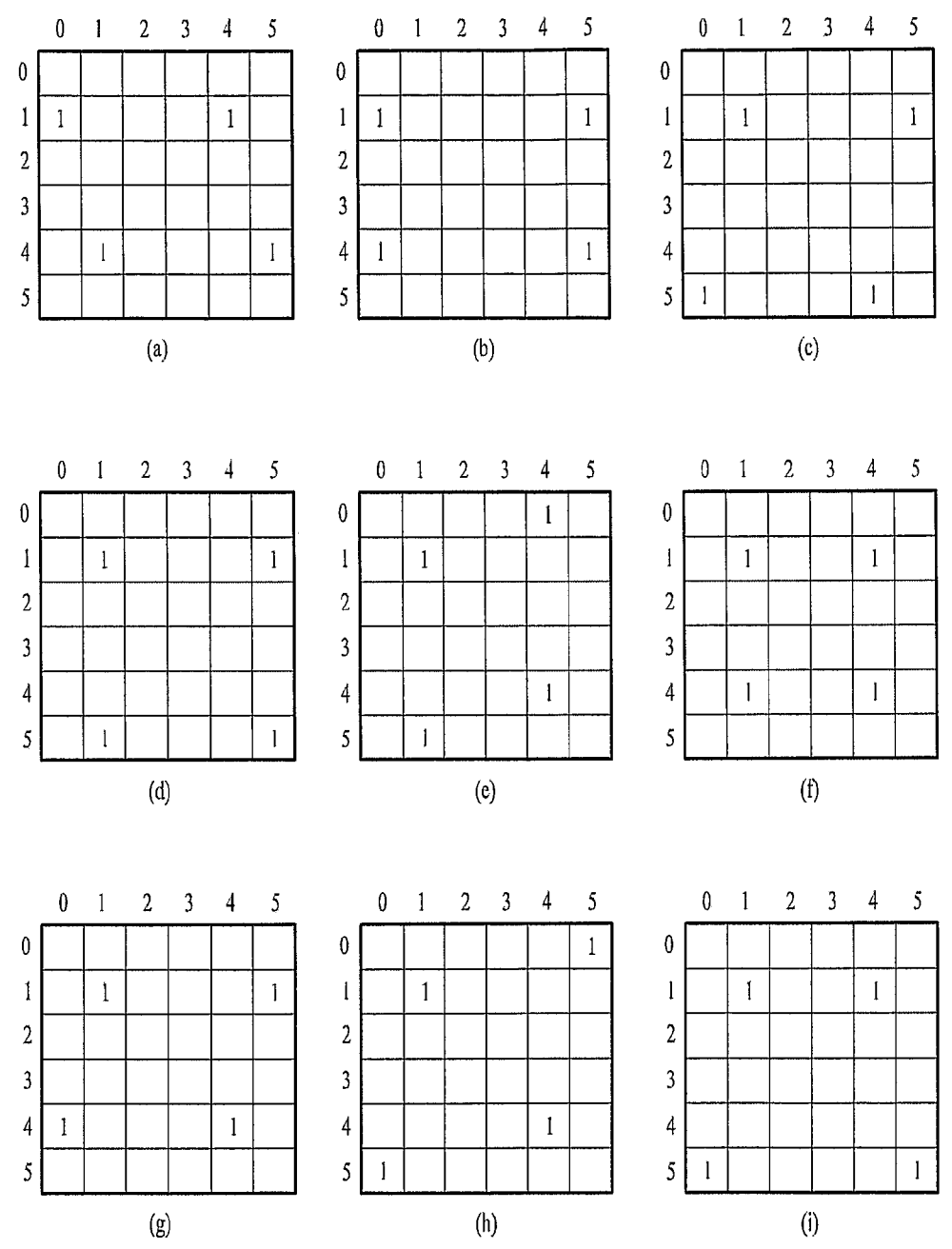

FIG. 6 illustrates further example of pilot allocation structures according to one embodiment of the present invention.

Specifically, FIG. 6 illustrates pilot allocation structures in the case where the number of transmit antennas is 1, each RB has a 6×6 structure, and the rate of pilot symbol allocation in an RB is about 11.11%.

In the pilot allocation structure of FIG. 6(a), in the second subcarrier (m=1), pilot symbols can be allocated to positions having OFDM symbol indices n of 0 and 4. In the fifth subcarrier (m=4), pilot symbols can be allocated to positions having OFDM symbol indices n of 1 and 5. In the pilot allocation structure of FIG. 6(b), in the subcarrier indices m of 1 and 4, pilot symbols can be allocated to positions having OFDM symbol indices n of 0 and 5. In the pilot allocation structure of FIG. 6(c), in the second subcarrier (m=1), pilot symbols can be allocated to positions having OFDM symbol indices n of 1 and 5. In the sixth subcarrier (m=5), pilot symbols can be allocated to positions having OFDM symbol indices n of 0 and 4.

In the pilot allocation structure of FIG. 6(d), in the subcarrier indices m of 1 and 5, pilot symbols can be allocated to positions having OFDM symbol indices n of 1 and 5. In the pilot allocation structure of FIG. 6(e), in the second OFDM symbol (n=1), pilot symbols can be allocated to positions having subcarrier indices m of 1 and 5. In the fifth OFDM symbol (n=4), pilot symbols can be allocated to positions having subcarrier indices m of 0 and 4. In the pilot allocation structure of FIG. 6(f), in the subcarrier indices m of 1 and 4, pilot symbols can be allocated to positions having OFDM symbol indices n of 1 and 4.

In the pilot allocation structure of FIG. 6(g), in the second subcarrier (m=1), pilot symbols can be allocated to positions having OFDM symbol indices n of 1 and 5. In the fifth subcarrier (m=4), pilot symbols can be allocated to positions having OFDM symbol indices n of 0 and 4. In the pilot allocation structure of FIG. 6(h), pilot symbols can be allocated to resource elements having coordinates (0,5), (1,1), (4,4) and (5,0). In the pilot allocation structure of FIG. 6(i), pilot symbols can be allocated to resource elements having coordinates (0,5), (1,1), (4,1) and (5,5).

Figure 7:
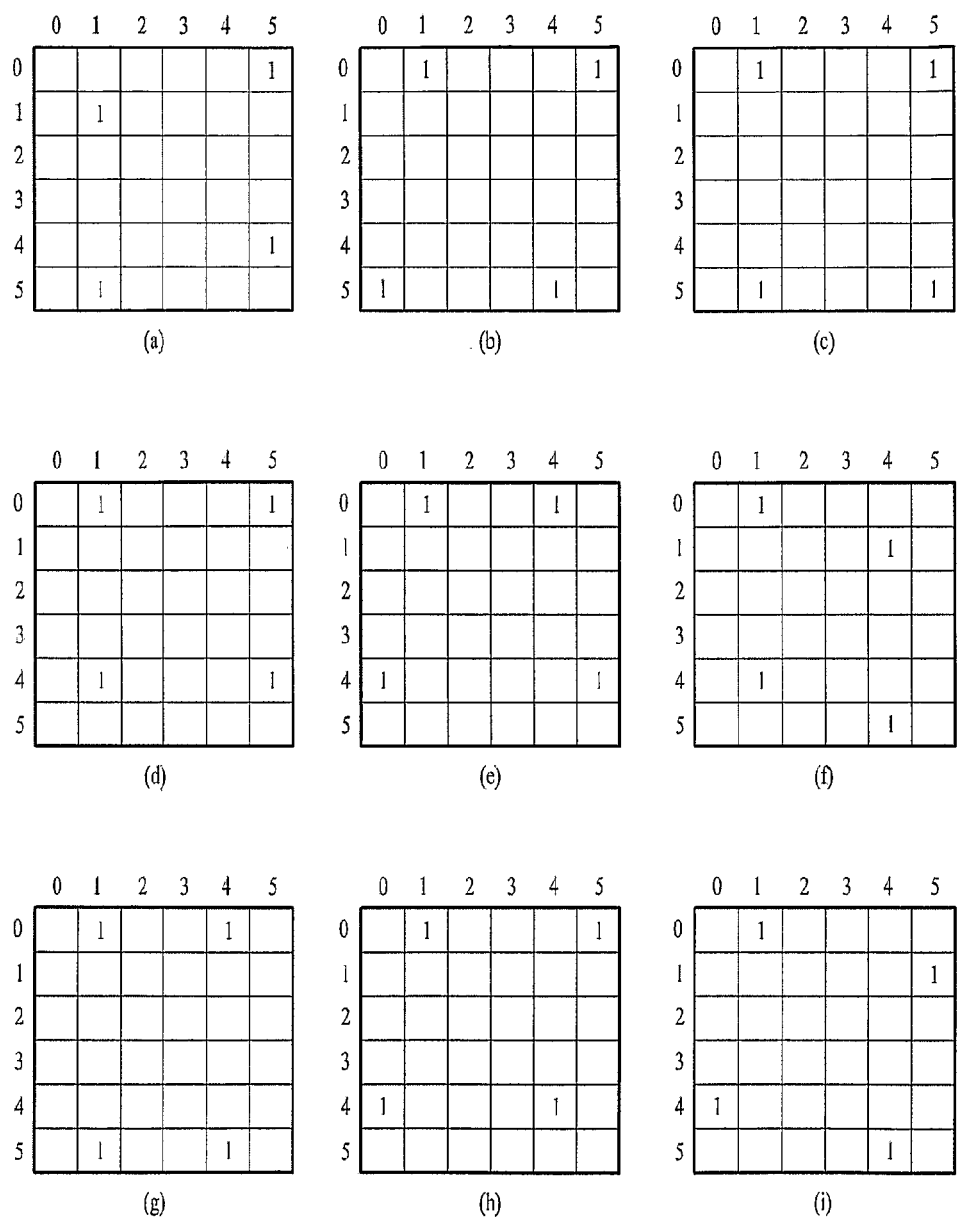

FIG. 7 illustrates still further example of pilot allocation structures according to one embodiment of the present invention.

Specifically, FIG. 7 illustrates pilot allocation structures in the case where the number of transmit antennas is 1, each RB has a 6×6 structure, and the rate of pilot symbol allocation in an RB is about 11.11%.

In the pilot allocation structure of FIG. 7(a), in the second OFDM symbol (n=1), pilot symbols can be allocated to positions having subcarrier indices m of 1 and 5. In the sixth OFDM symbol (n=5), pilot symbols can be allocated to positions having subcarrier indices m of 0 and 4. In the pilot allocation structure of FIG. 7(b), in the first subcarrier (m=0), pilot symbols can be allocated to positions having OFDM symbol indices n of 1 and 5. In the sixth subcarrier (m=5), pilot symbols can be allocated to positions having OFDM symbol indices n of 0 and 4. In the pilot allocation structure of FIG. 7(c), in the subcarrier indices m of 0 and 5, pilot symbols can be allocated to positions having OFDM symbol indices n of 1 and 5.

In the pilot allocation structure of FIG. 7(d), in the subcarrier indices m of 0 and 4, pilot symbols can be allocated to positions having OFDM symbol indices n of 1 and 5. In the pilot allocation structure of FIG. 7(e), pilot symbols can be allocated to resource elements having coordinates (0,4), (1,0), (4,0) and (5,4). In the pilot allocation structure of FIG. 7(f), pilot symbols can be allocated to resource elements having coordinates (1,0), (1,4), (4,1) and (4,5).

In the pilot allocation structure of FIG. 7(g), in the subcarrier indices m of 0 and 5, pilot symbols can be allocated to positions having OFDM symbol indices n of 1 and 4. In the pilot allocation structure of FIG. 7(h), in the first subcarrier (m=0), pilot symbols can be allocated to positions having OFDM symbol indices n of 1 and 5. In the fifth subcarrier (m=4), pilot symbols can be allocated to positions having OFDM symbol indices n of 0 and 4. In the pilot allocation structure of FIG. 7(i), pilot symbols can be allocated to resource elements having coordinates (0,4), (1,0), (4,5) and (5,1).

Figure 8:
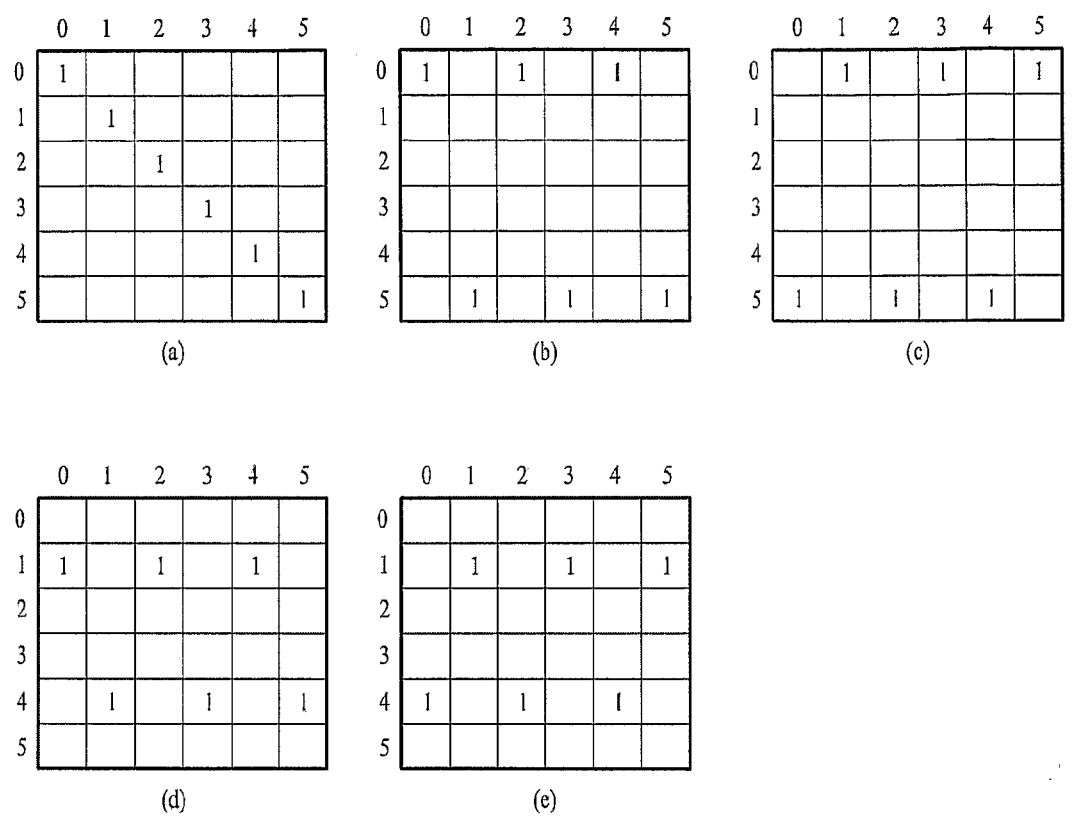

FIG. 8 illustrates still further example of pilot allocation structures according to one embodiment of the present invention.

Specifically, FIG. 8 illustrates pilot allocation structures in the case where the number of transmit antennas is 1, each RB has a 6×6 structure, and the rate of pilot symbol allocation in an RB is about 16.67%.

FIG. 8(a) illustrates a pilot allocation structure for an RB having a 6×6 structure whose pilot symbols are allocated on a diagonal direction. Namely, in the pilot allocation structure of FIG. 8(*a*), pilot symbols can be allocated to resource elements having coordinates (0,0), (1,1), (2,2), (3,3), (4,4), (5,5) and (6,6). Also, the pilot symbols can be allocated on the other diagonal direction. Namely, the pilot symbols can be allocated to resource elements having coordinates (0,5), (1,4), (2,3), (3,2), (4,1) and (5,0).

In the pilot allocation structure of FIG. 8(*b*), in the first subcarrier (m=0), pilot symbols can be allocated to positions having OFDM symbol indices n of 0, 2 and 4. In the sixth subcarrier (m=5), pilot symbols can be allocated to positions having OFDM symbol indices n of 1, 3 and 5.

In the pilot allocation structure of FIG. 8(*c*), in the first subcarrier (m=0), pilot symbols can be allocated to positions having OFDM symbol indices n of 1, 3 and 5. In the sixth subcarrier (m=5), pilot symbols can be allocated to positions having OFDM symbol indices n of 0, 2 and 4.

In the pilot allocation structure of FIG. 8(*d*), in the second subcarrier (m=1), pilot symbols can be allocated to positions having OFDM symbol indices n of 0, 2 and 4. In the fifth subcarrier (m=4), pilot symbols can be allocated to positions having OFDM symbol indices n of 1, 3 and 5.

In the pilot allocation structure of FIG. 8(*e*), in the second subcarrier (m=0), pilot symbols can be allocated to positions having OFDM symbol indices n of 1, 3 and 5. In the fifth subcarrier (m=4), pilot symbols can be allocated to positions having OFDM symbol indices n of 0, 2 and 4.

Figure 9:
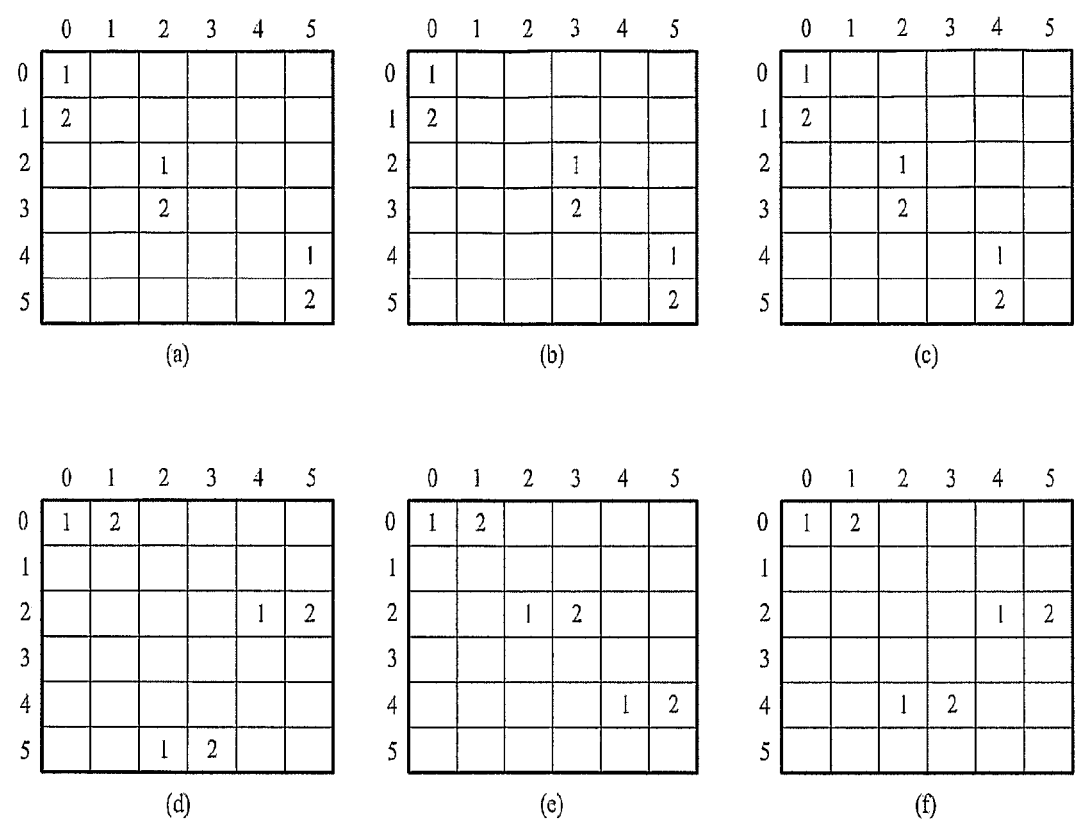

FIG. 9 illustrates still further example of pilot allocation structures according to one embodiment of the present invention.

Specifically, FIG. 9 illustrates pilot allocation structures in the case where the number of transmit antennas is 2, each RB has a 6×6 structure, and the rate of pilot symbol allocation in an RB is about 16.67%.

FIGS. 9(*a*) to 9(*c*) illustrate the pilot allocation structures which can usually be applied to the case where the first antenna and the second antenna support Spatial Frequency Block Coding (SFBC) scheme, and FIGS. 9(*d*) to 9(*f*) illustrate the pilot allocation structures which can usually be applied to the case where the first antenna and the second antenna support Spatial Time Block Coding (STBC) scheme.

In the pilot allocation structure of FIG. 9(*a*), the pilot symbols for the first antenna can be allocated to resource elements having coordinates (0,0), (2,2) and (5,4), and the pilot symbols for the second antenna can be allocated to resource elements having coordinates (0,1), (2,3) and (5,5).

In the pilot allocation structure of FIG. 9(*b*), the pilot symbols for the first antenna can be allocated to resource elements having coordinates (0,0), (3,2) and (5,4), and the pilot symbols for the second antenna can be allocated to resource elements having coordinates (0,1), (3,3) and (5,5).

In the pilot allocation structure of FIG. 9(*c*), the pilot symbols for the first antenna can be allocated to resource elements having coordinates (0,0), (2,2) and (4,4), and the pilot symbols for the second antenna can be allocated to resource elements having coordinates (0,1), (2,3) and (4,5).

In the pilot allocation structure of FIG. 9(*d*), the pilot symbols for the first antenna can be allocated to resource elements having coordinates (0,0), (2,5) and (4,2), and the pilot symbols for the second antenna can be allocated to resource elements having coordinates (1,0), (3,5) and (5,2).

In the pilot allocation structure of FIG. 9(*e*), the pilot symbols for the first antenna can be allocated to resource elements having coordinates (0,0), (2,2) and (4,4), and the pilot symbols for the second antenna can be allocated to resource elements having coordinates (1,0), (3,2) and (5,4).

In the pilot allocation structure of FIG. 9(*f*), the pilot symbols for the first antenna can be allocated to resource elements having coordinates (0,0), (2,4) and (4,2), and the pilot symbols for the second antenna can be allocated to resource elements having coordinates (1,0), (3,4) and (5,2).

In the pilot allocation structure of FIGS. 9(*a*) to 9(*c*), It can be observed that the pilot symbols for both the first antenna and the second antenna are allocated to the direction adjacent to the frequency domain (i.e. subcarrier index) to support SFBC. Moreover, in the pilot allocation structure of FIGS. 9(*d*) to 9(*f*), It can be observed that the pilot symbols for both the first antenna and the second antenna are allocated to the direction adjacent to the time domain (i.e. OFDM symbol index) to support STBC.

Figure 10:
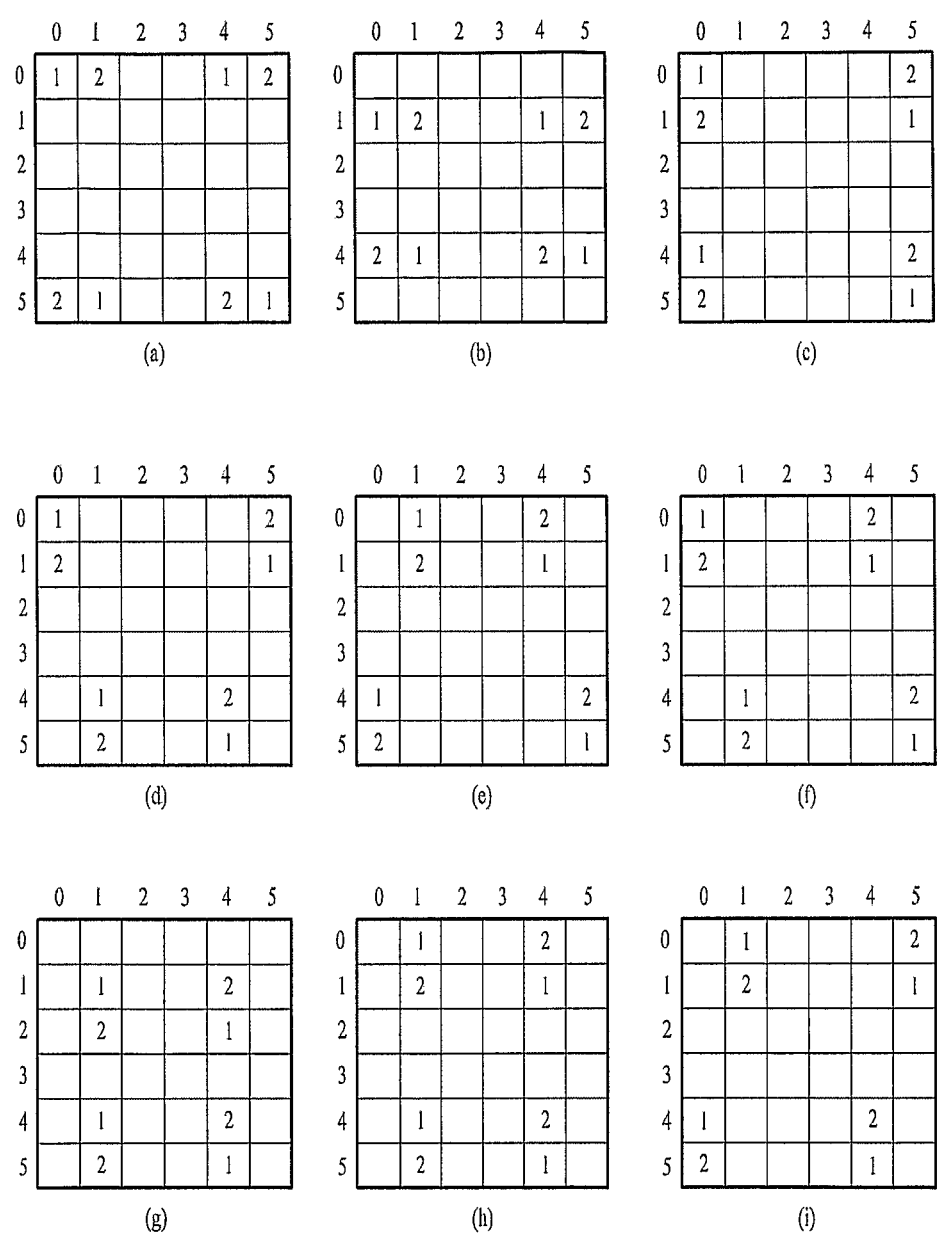

FIG. 10 illustrates still further example of pilot allocation structures according to one embodiment of the present invention.

Specifically, FIG. 10 illustrates pilot allocation structures in the case where the number of transmit antennas is 2, each RB has a 6×6 structure, and the rate of pilot symbol allocation in an RB is about 22.22%.

FIGS. 10(*a*) and 10(*b*) illustrate the pilot allocation structures which can usually be applied to the case where the first antenna and the second antenna support Spatial Time Block Coding (STBC) scheme, and FIGS. 10(*c*) to 10(*i*) illustrate the pilot allocation structures which can usually be applied to the case where the first antenna and the second antenna support Spatial Frequency Block Coding (SFBC) scheme.

In the pilot allocation structure of FIG. 10(*a*), the pilot symbols for the first antenna can be allocated to resource elements having coordinates (0,0), (1,5), (4,0) and (5,5) and the pilot symbols for the second antenna can be allocated to resource elements having coordinates (0,5), (1,0), (4,5) and (5,0).

In the pilot allocation structure of FIG. 10(*b*), the pilot symbols for the first antenna can be allocated to resource elements having coordinates (0,1), (1,4), (4,1) and (5,4) and the pilot symbols for the second antenna can be allocated to resource elements having coordinates (0,4), (1,1), (4,4) and (5,1).

In the pilot allocation structure of FIG. 10(*c*), the pilot symbols for the first antenna can be allocated to resource elements having coordinates (0,0), (0,4), (5,1) and (5,5) and the pilot symbols for the second antenna can be allocated to resource elements having coordinates (0,1), (0,5), (5,0) and (5,4).

In the pilot allocation structure of FIG. 10(*d*), the pilot symbols for the first antenna can be allocated to resource elements having coordinates (0,0), (1,4), (4,5) and (5,1) and the pilot symbols for the second antenna can be allocated to resource elements having coordinates (0,1), (1,5), (4,4) and (5,0).

In the pilot allocation structure of FIG. 10(*e*), the pilot symbols for the first antenna can be allocated to resource elements having coordinates (0,4), (1,0), (4,1) and (5,5) and the pilot symbols for the second antenna can be allocated to resource elements having coordinates (0,5), (1,1), (4,0) and (5,4).

In the pilot allocation structure of FIG. 10(*f*), the pilot symbols for the first antenna can be allocated to resource elements having coordinates (0,0), (1,4), (4,1) and (5,5) and the pilot symbols for the second antenna can be allocated to resource elements having coordinates (0,1), (1,5), (4,0) and (5,4).

In the pilot allocation structure of FIG. 10(*g*), the pilot symbols for the first antenna can be allocated to resource elements having coordinates (1,1), (1,4), (4,2) and (4,5) and the pilot symbols for the second antenna can be allocated to resource elements having coordinates (1,2), (1,5), (4,1) and (4,4).

In the pilot allocation structure of FIG. 10(h), the pilot symbols for the first antenna can be allocated to resource elements having coordinates (1,0), (1,4), (4,1) and (4,5) and the pilot symbols for the second antenna can be allocated to resource elements having coordinates (1,1), (1,5), (4,0) and (4,4).

In the pilot allocation structure of FIG. 10(i), the pilot symbols for the first antenna can be allocated to resource elements having coordinates (0,4), (1,0), (4,5) and (5,1) and the pilot symbols for the second antenna can be allocated to resource elements having coordinates (0,5), (1,1), (4,4) and (5,0).

Figure 11:
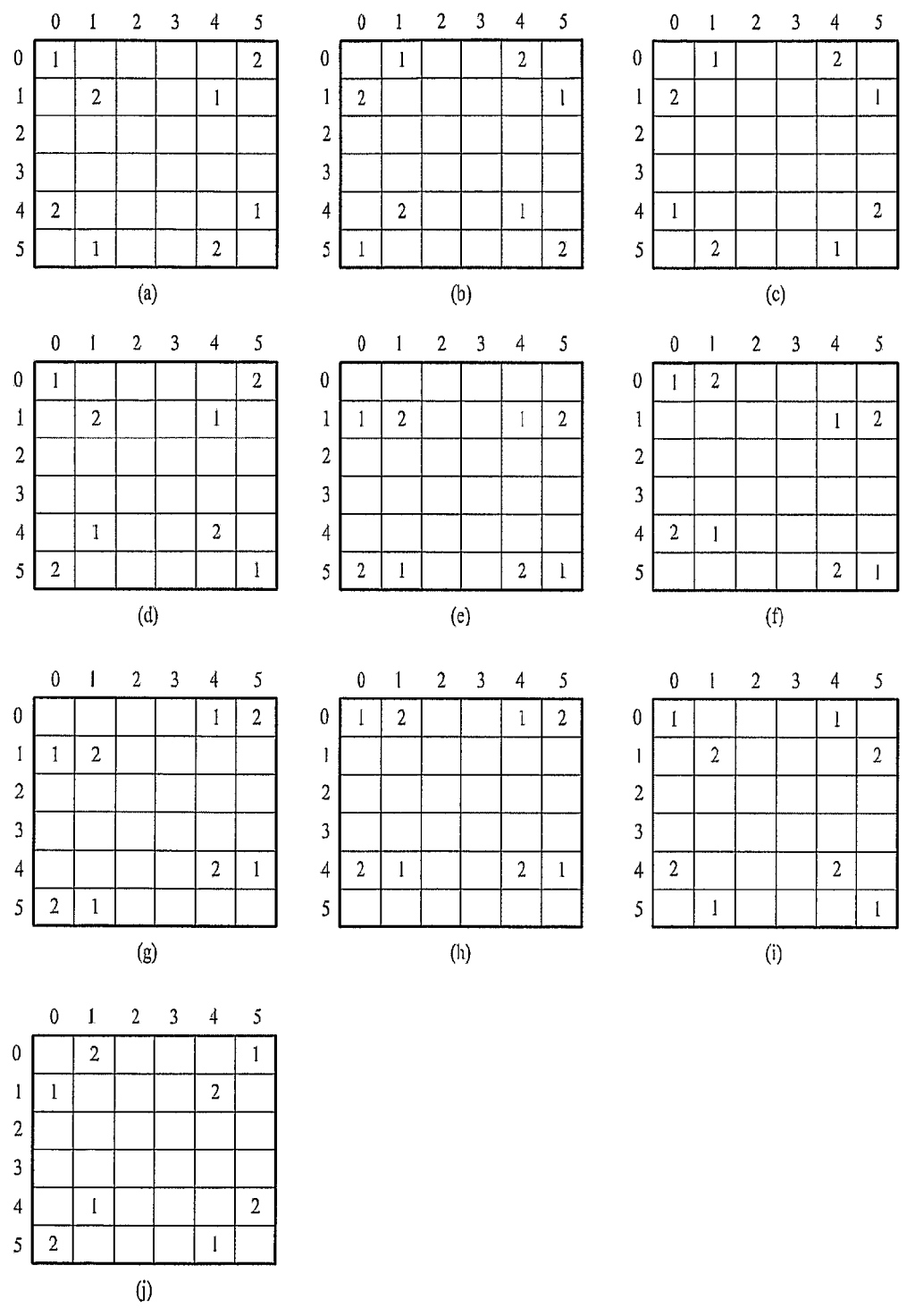

FIG. 11 illustrates still further example of pilot allocation structures according to one embodiment of the present invention.

Specifically, FIG. 11 illustrates pilot allocation structures in the case where the number of transmit antennas is 2, each RB has a 6×6 structure, and the rate of pilot symbol allocation in an RB is about 22.22%.

In the pilot allocation structure of FIG. 11(a), the pilot symbols for the first antenna can be allocated to resource elements having coordinates (0,0), (1,5), (4,1) and (5,4) and the pilot symbols for the second antenna can be allocated to resource elements having coordinates (0,4), (1,1), (4,5) and (5,0).

In the pilot allocation structure of FIG. 11(b), the pilot symbols for the first antenna can be allocated to resource elements having coordinates (0,5), (1,0), (4,4) and (5,1) and the pilot symbols for the second antenna can be allocated to resource elements having coordinates (0,1), (1,4), (4,0) and (5,5).

In the pilot allocation structure of FIG. 11(c), the pilot symbols for the first antenna can be allocated to resource elements having coordinates (0,4), (1,0), (4,5) and (5,1) and the pilot symbols for the second antenna can be allocated to resource elements having coordinates (0,1), (1,5), (4,0) and (5,4).

In the pilot allocation structure of FIG. 11(d), the pilot symbols for the first antenna can be allocated to resource elements having coordinates (0,0), (1,4), (4,1) and (5,5) and the pilot symbols for the second antenna can be allocated to resource elements having coordinates (0,5), (1,1), (4,4) and (5,0).

In the pilot allocation structure of FIG. 11(e), the pilot symbols for the first antenna can be allocated to resource elements having coordinates (0,1), (1,5), (4,1) and (5,5) and the pilot symbols for the second antenna can be allocated to resource elements having coordinates (0,5), (1,1), (4,5) and (5,1).

In the pilot allocation structure of FIG. 11(f), the pilot symbols for the first antenna can be allocated to resource elements having coordinates (0,0), (1,4), (4,1) and (5,5) and the pilot symbols for the second antenna can be allocated to resource elements having coordinates (0,4), (1,0), (4,5) and (5,1).

In the pilot allocation structure of FIG. 11(g), the pilot symbols for the first antenna can be allocated to resource elements having coordinates (0,1), (1,5), (4,0) and (5,4) and the pilot symbols for the second antenna can be allocated to resource elements having coordinates (0,4), (1,0), (4,4) and (5,0).

In the pilot allocation structure of FIG. 11(h), the pilot symbols for the first antenna can be allocated to resource elements having coordinates (0,0), (1,4), (4,1) and (5,4) and the pilot symbols for the second antenna can be allocated to resource elements having coordinates (0,4), (1,0), (4,4) and (5,0).

In the pilot allocation structure of FIG. 11(i), the pilot symbols for the first antenna can be allocated to resource elements having coordinates (0,0), (1,5), (4,0) and (5,5) and the pilot symbols for the second antenna can be allocated to resource elements having coordinates (0,4), (1,1), (4,4) and (5,1).

In the pilot allocation structure of FIG. 11(j), the pilot symbols for the first antenna can be allocated to resource elements having coordinates (0,1), (1,4), (4,5) and (5,0) and the pilot symbols for the second antenna can be allocated to resource elements having coordinates (0,5), (1,0), (4,1) and (5,4).

Figure 12:
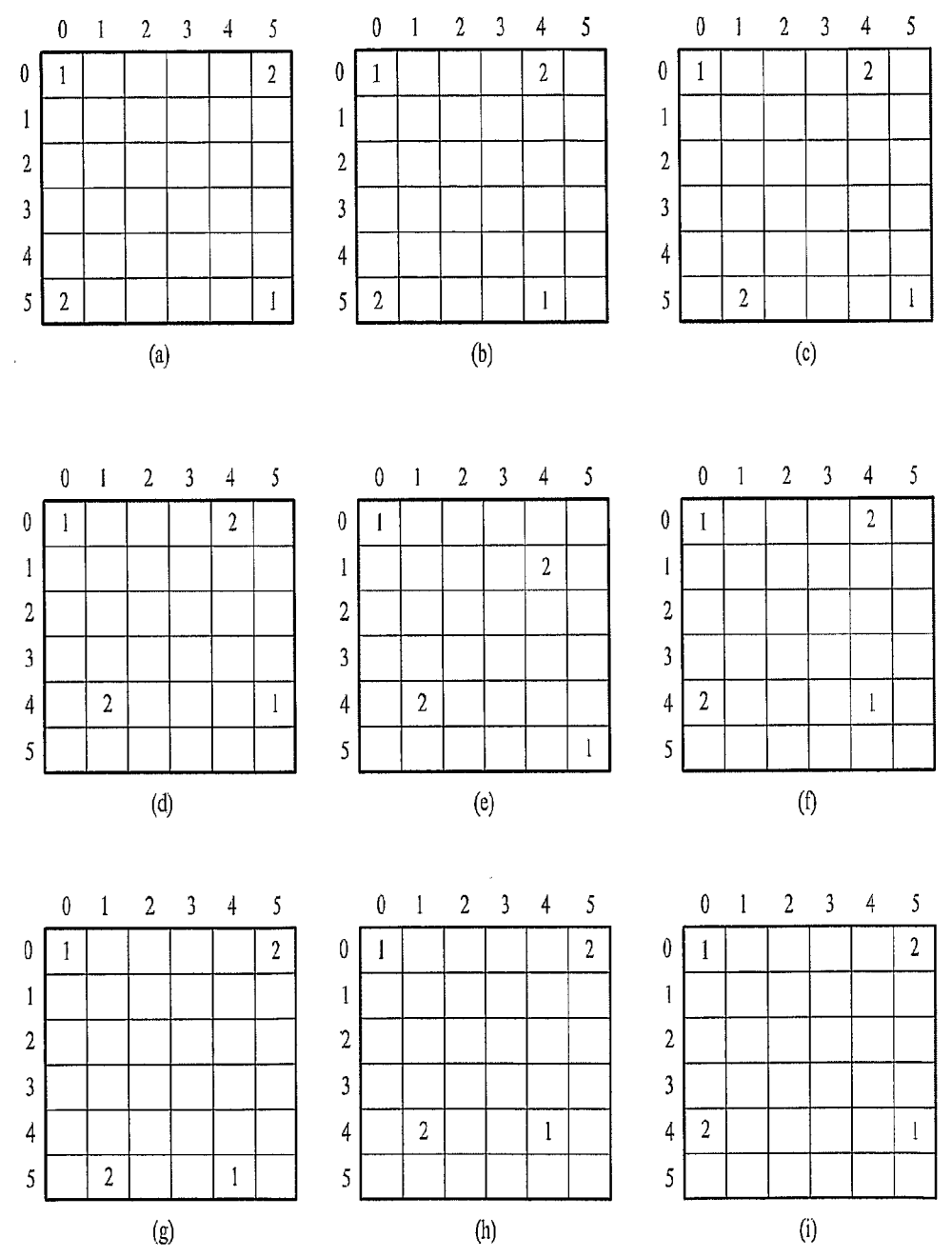

FIG. 12 illustrates still further example of pilot allocation structures according to one embodiment of the present invention.

Specifically, FIG. 12 illustrates pilot allocation structures in the case where the number of transmit antennas is 2, each RB has a 6×6 structure, and the rate of pilot symbol allocation in an RB is about 11.11%.

In the pilot allocation structure of FIG. 12(a), the pilot symbols for the first antenna can be allocated to resource elements having coordinates (0,0) and (5,5) and the pilot symbols for the second antenna can be allocated to resource elements having coordinates (0,5) and (5,0).

In the pilot allocation structure of FIG. 12(b), the pilot symbols for the first antenna can be allocated to resource elements having coordinates (0,0) and (4,5) and the pilot symbols for the second antenna can be allocated to resource elements having coordinates (0,5) and (4,0).

In the pilot allocation structure of FIG. 12(c), the pilot symbols for the first antenna can be allocated to resource elements having coordinates (0,0) and (5,5) and the pilot symbols for the second antenna can be allocated to resource elements having coordinates (1,5) and (4,0).

In the pilot allocation structure of FIG. 12(d), the pilot symbols for the first antenna can be allocated to resource elements having coordinates (0,0) and (5,4) and the pilot symbols for the second antenna can be allocated to resource elements having coordinates (1,4) and (4,0).

In the pilot allocation structure of FIG. 12(e), the pilot symbols for the first antenna can be allocated to resource elements having coordinates (0,0) and (5,5) and the pilot symbols for the second antenna can be allocated to resource elements having coordinates (1,4) and (4,1).

In the pilot allocation structure of FIG. 12(f), the pilot symbols for the first antenna can be allocated to resource elements having coordinates (0,0) and (4,4) and the pilot symbols for the second antenna can be allocated to resource elements having coordinates (0,4) and (4,0).

In the pilot allocation structure of FIG. 12(g), the pilot symbols for the first antenna can be allocated to resource elements having coordinates (0,0) and (4,5) and the pilot symbols for the second antenna can be allocated to resource elements having coordinates (1,5) and (5,0).

In the pilot allocation structure of FIG. 12(h), the pilot symbols for the first antenna can be allocated to resource elements having coordinates (0,0) and (4,4) and the pilot symbols for the second antenna can be allocated to resource elements having coordinates (1,4) and (5,0).

In the pilot allocation structure of FIG. 12(i), the pilot symbols for the first antenna can be allocated to resource elements having coordinates (0,0) and (5,4) and the pilot symbols for the second antenna can be allocated to resource elements having coordinates (0,4) and (5,0).

Figure 13:
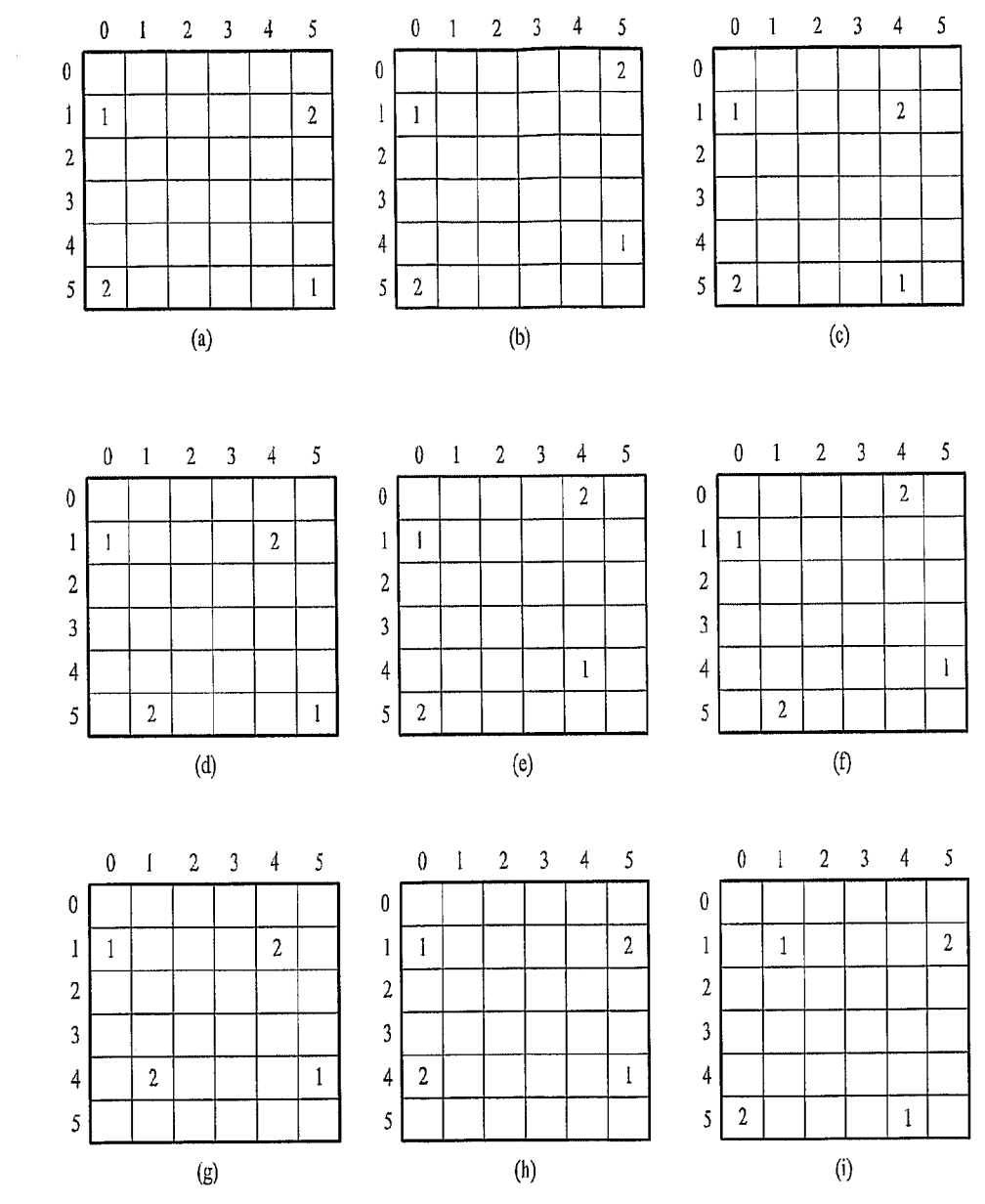

FIG. 13 illustrates still further example of pilot allocation structures according to one embodiment of the present invention.

Specifically, FIG. 13 illustrates pilot allocation structures in the case where the number of transmit antennas is 2, each RB has a 6×6 structure, and the rate of pilot symbol allocation in an RB is about 11.11%.

In the pilot allocation structure of FIG. 13(a), the pilot symbols for the first antenna can be allocated to resource elements having coordinates (0,1) and (5,5) and the pilot symbols for the second antenna can be allocated to resource elements having coordinates (0,5) and (5,1).

In the pilot allocation structure of FIG. 13(b), the pilot symbols for the first antenna can be allocated to resource elements having coordinates (0,1) and (5,4) and the pilot symbols for the second antenna can be allocated to resource elements having coordinates (0,5) and (5,0).

In the pilot allocation structure of FIG. 13(c), the pilot symbols for the first antenna can be allocated to resource elements having coordinates (0,1) and (4,5) and the pilot symbols for the second antenna can be allocated to resource elements having coordinates (0,5) and (4,1).

In the pilot allocation structure of FIG. 13(d), the pilot symbols for the first antenna can be allocated to resource elements having coordinates (0,1) and (5,5) and the pilot symbols for the second antenna can be allocated to resource elements having coordinates (1,5) and (4,1).

In the pilot allocation structure of FIG. 13(e), the pilot symbols for the first antenna can be allocated to resource elements having coordinates (0,1) and (4,4) and the pilot symbols for the second antenna can be allocated to resource elements having coordinates (0,5) and (4,0).

In the pilot allocation structure of FIG. 13(f), the pilot symbols for the first antenna can be allocated to resource elements having coordinates (0,1) and (5,4) and the pilot symbols for the second antenna can be allocated to resource elements having coordinates (1,5) and (4,0).

In the pilot allocation structure of FIG. 13(g), the pilot symbols for the first antenna can be allocated to resource elements having coordinates (0,1) and (5,4) and the pilot symbols for the second antenna can be allocated to resource elements having coordinates (1,4) and (4,1).

In the pilot allocation structure of FIG. 13(h), the pilot symbols for the first antenna can be allocated to resource elements having coordinates (0,1) and (5,4) and the pilot symbols for the second antenna can be allocated to resource elements having coordinates (0,4) and (5,1).

In the pilot allocation structure of FIG. 13(i), the pilot symbols for the first antenna can be allocated to resource elements having coordinates (1,1) and (4,5) and the pilot symbols for the second antenna can be allocated to resource elements having coordinates (0,5) and (5,1).

Figure 14:
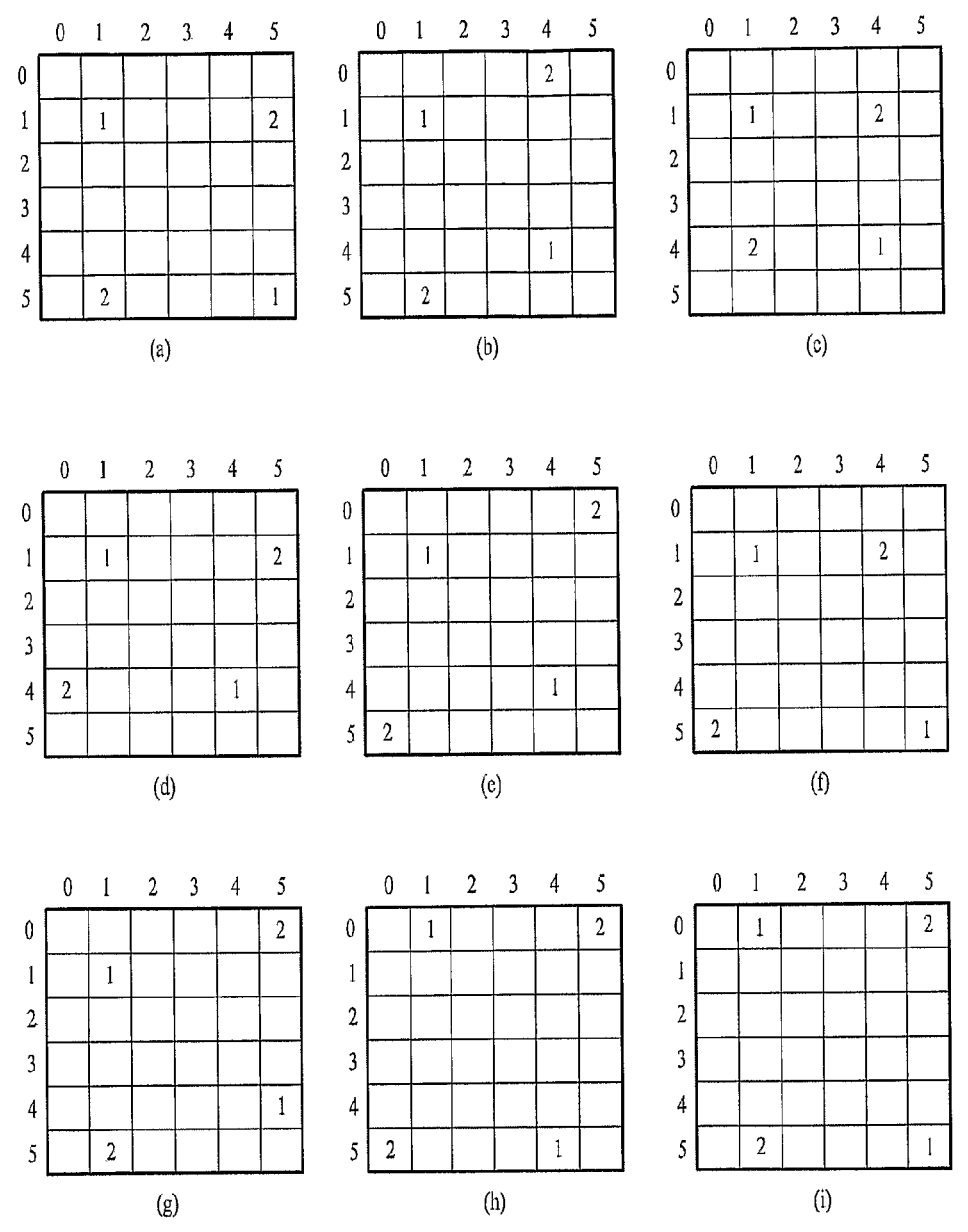

FIG. 14 illustrates still further example of pilot allocation structures according to one embodiment of the present invention.

Specifically, FIG. 11 illustrates pilot allocation structures in the case where the number of transmit antennas is 2, each RB has a 6×6 structure, and the rate of pilot symbol allocation in an RB is about 11.11%.

In the pilot allocation structure of FIG. 14(a), the pilot symbols for the first antenna can be allocated to resource elements having coordinates (1,1) and (5,5) and the pilot symbols for the second antenna can be allocated to resource elements having coordinates (1,5) and (5,1).

In the pilot allocation structure of FIG. 14(b), the pilot symbols for the first antenna can be allocated to resource elements having coordinates (1,1) and (4,4) and the pilot symbols for the second antenna can be allocated to resource elements having coordinates (1,5) and (4,0).

In the pilot allocation structure of FIG. 14(c), the pilot symbols for the first antenna can be allocated to resource elements having coordinates (1,1) and (4,4) and the pilot symbols for the second antenna can be allocated to resource elements having coordinates (1,4) and (4,1).

In the pilot allocation structure of FIG. 14(d), the pilot symbols for the first antenna can be allocated to resource elements having coordinates (1,1) and (4,4) and the pilot symbols for the second antenna can be allocated to resource elements having coordinates (0,4) and (5,1).

In the pilot allocation structure of FIG. 14(e), the pilot symbols for the first antenna can be allocated to resource elements having coordinates (1,1) and (4,4) and the pilot symbols for the second antenna can be allocated to resource elements having coordinates (0,5) and (5,0).

In the pilot allocation structure of FIG. 14(f), the pilot symbols for the first antenna can be allocated to resource elements having coordinates (1,1) and (5,5) and the pilot symbols for the second antenna can be allocated to resource elements having coordinates (0,5) and (4,1).

In the pilot allocation structure of FIG. 14(g), the pilot symbols for the first antenna can be allocated to resource elements having coordinates (1,1) and (5,4) and the pilot symbols for the second antenna can be allocated to resource elements having coordinates (1,5) and (5,0).

In the pilot allocation structure of FIG. 14(h), the pilot symbols for the first antenna can be allocated to resource elements having coordinates (1,0) and (4,5) and the pilot symbols for the second antenna can be allocated to resource elements having coordinates (0,5) and (5,0).

In the pilot allocation structure of FIG. 14(i), the pilot symbols for the first antenna can be allocated to resource elements having coordinates (1,0) and (5,5) and the pilot symbols for the second antenna can be allocated to resource elements having coordinates (1,5) and (5,0).

Figure 15:
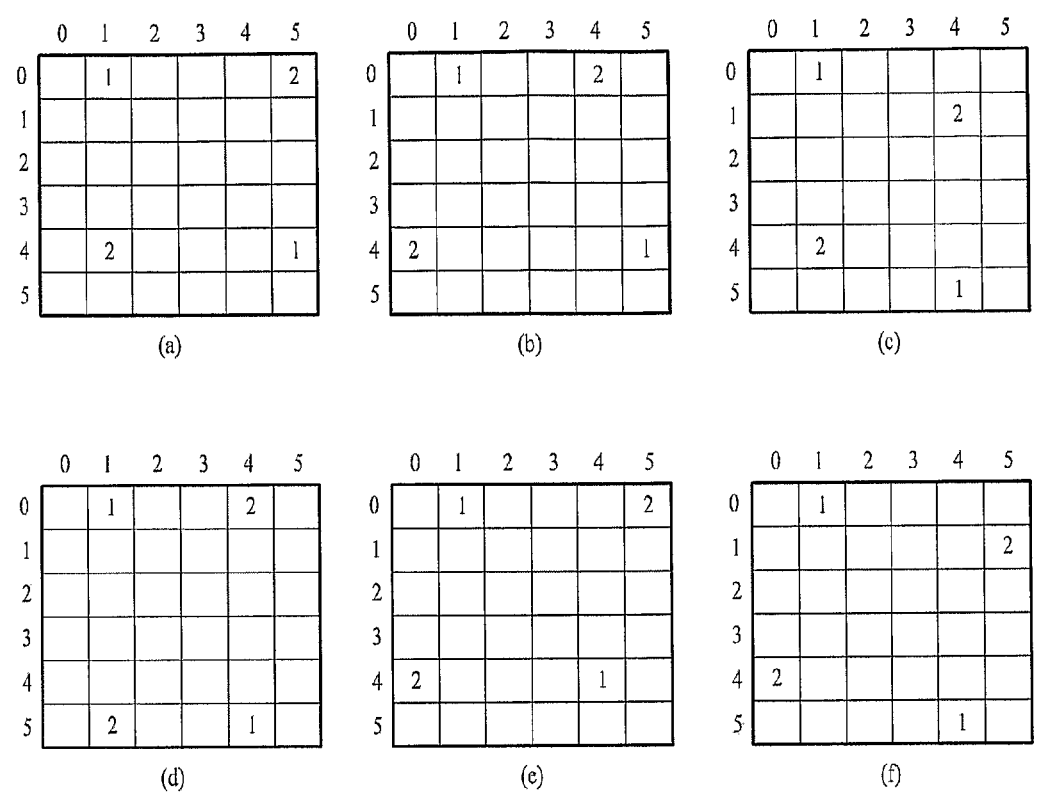

FIG. 15 illustrates still further example of pilot allocation structures according to one embodiment of the present invention.

Specifically, FIG. 15 illustrates pilot allocation structures in the case where the number of transmit antennas is 2, each RB has a 6×6 structure, and the rate of pilot symbol allocation in an RB is about 11.11%.

In the pilot allocation structure of FIG. 15(a), the pilot symbols for the first antenna can be allocated to resource elements having coordinates (1,0) and (5,4) and the pilot symbols for the second antenna can be allocated to resource elements having coordinates (1,4) and (5,0).

In the pilot allocation structure of FIG. 15(b), the pilot symbols for the first antenna can be allocated to resource elements having coordinates (1,0) and (5,4) and the pilot symbols for the second antenna can be allocated to resource elements having coordinates (0,4) and (4,0).

In the pilot allocation structure of FIG. 15(c), the pilot symbols for the first antenna can be allocated to resource elements having coordinates (1,0) and (4,5) and the pilot symbols for the second antenna can be allocated to resource elements having coordinates (1,5) and (4,0).

In the pilot allocation structure of FIG. 15(d), the pilot symbols for the first antenna can be allocated to resource elements having coordinates (1,0) and (4,5) and the pilot symbols for the second antenna can be allocated to resource elements having coordinates (1,4) and (4,1).

In the pilot allocation structure of FIG. 15(e), the pilot symbols for the first antenna can be allocated to resource elements having coordinates (1,0) and (4,4) and the pilot symbols for the second antenna can be allocated to resource elements having coordinates (0,4) and (5,0).

In the pilot allocation structure of FIG. 15(*f*), the pilot symbols for the first antenna can be allocated to resource elements having coordinates (1,0) and (4,5) and the pilot symbols for the second antenna can be allocated to resource elements having coordinates (0,4) and (5,1).

Figure 16:
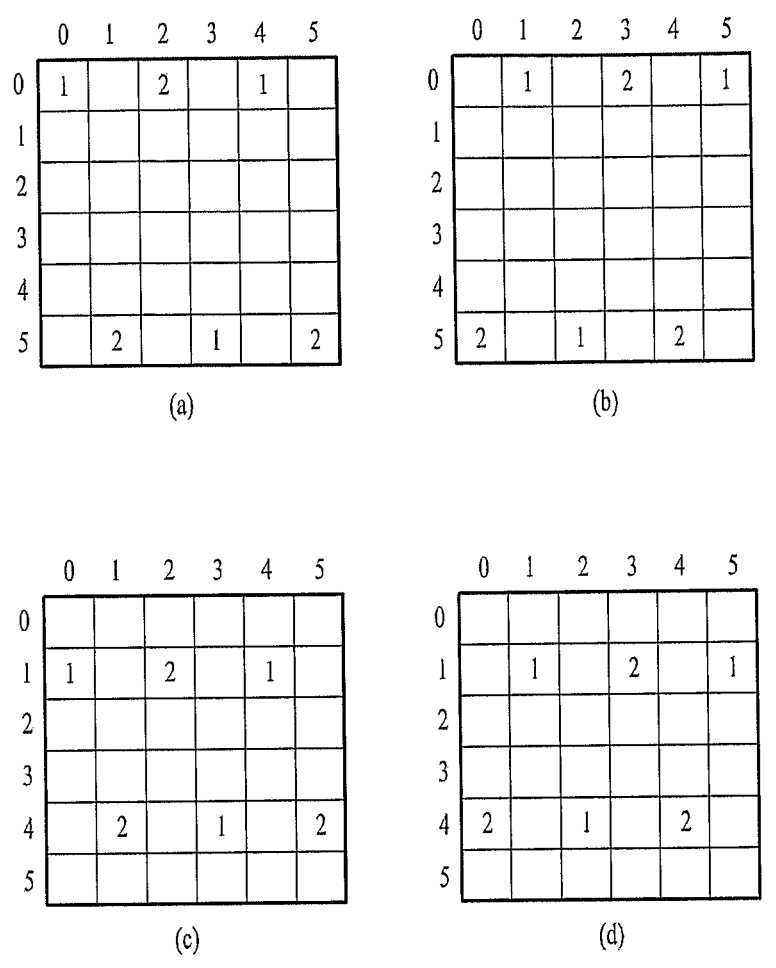

FIG. 16 illustrates still further example of pilot allocation structures according to one embodiment of the present invention.

Specifically, FIG. 16 illustrates pilot allocation structures in the case where the number of transmit antennas is 2, each RB has a 6×6 structure, and the rate of pilot symbol allocation in an RB is about 16.67%. The pilot allocation structures of FIG. 16 have an additional pilot symbol per each antenna in comparison to those of FIG. 15.

In the pilot allocation structure of FIG. 16(*a*), the pilot symbols for the first antenna can be allocated to resource elements having coordinates (0,0), (3,5) and (4,0) and the pilot symbols for the second antenna can be allocated to resource elements having coordinates (1,5), (2,0) and (5,5).

In the pilot allocation structure of FIG. 16(*b*), the pilot symbols for the first antenna can be allocated to resource elements having coordinates (1,0), (2,5) and (5,0) and the pilot symbols for the second antenna can be allocated to resource elements having coordinates (0,5), (3,0) and (4,5).

In the pilot allocation structure of FIG. 16(*c*), the pilot symbols for the first antenna can be allocated to resource elements having coordinates (0,1), (3,4) and (4,1) and the pilot symbols for the second antenna can be allocated to resource elements having coordinates (1,4), (3,4) and (5,4).

In the pilot allocation structure of FIG. 16(*d*), the pilot symbols for the first antenna can be allocated to resource elements having coordinates (1,1), (2,4) and (5,1) and the pilot symbols for the second antenna can be allocated to resource elements having coordinates (0,4), (3,1) and (4,4).

The following is a description of exemplary methods for cyclically shifting a pilot allocation structure according to a second embodiment of the present invention.

When the same pilot allocation structure is used in all cells, each pilot symbol is allocated at the same position in each cell or each antenna. In this case, interference may occur between pilot symbols of different cells or different antennas. In addition, if pilot power boosting is used in order to improve channel estimation capabilities, this may accelerate the reduction of capabilities due to such interference effects or pilot position collision.

It is preferable that pilot allocation structures that do not overlap be used for different cells in order to overcome this problem. However, it is more preferable that pilot allocation structures which do not overlap without departing from conventional pilot structures be used for different cells.

Accordingly, another embodiment of the present invention provides a method for allocating pilots by cyclically shifting pilots allocated according to a conventional pilot allocation scheme in each cell and pilot allocation structures generated using the method. When a specific pilot allocation structure is determined, it is possible to use a pilot allocation structure generated by cyclically shifting the specific pilot allocation structure in the time or frequency domain in each cell.

For example, the pilot allocation structures in FIGS. 4 to 16 can be repeatedly allocated on the time axis and the frequency axis. Also, each of the pilot allocation structures can be cyclically shifted to the left side or to the right side by at least one OFDM symbol unit on the time (i.e. OFDM symbol) axis. Moreover, each of the pilot allocation structures can be cyclically shifted to the upper side or to the lower side by at least one subcarrier unit on the frequency (i.e. subcarrier) axis. It is also possible to generate new pilot allocation structures by cyclically shifting each of the pilot allocation structures on both the time axis and the frequency axis.

Users can use each of the new pilot allocation structures generated by cyclically shifting the specific pilot allocation structure as an individual pilot allocation structure. That is, pilot allocation structures generated through cyclic shift can each be used as an individual allocation structure in each cell or base station.

It is possible to use all or part of the pilot allocation structures in the pilot allocation structures generated through cyclic shift according to the second embodiment of the present invention. Here, each base station may previously define a pilot allocation structure for use.

Although the indices of pilot allocation structures described in the embodiments of the present invention may each be arbitrarily mapped to a pilot symbol allocation method for use with the pilot allocation structure, the same pilot allocation structure is not mapped to different pilot symbol allocation methods. However, in some cases, base stations may use the same pilot allocation structure.

The following is a description of the embodiments which above explained cyclic shift methods are applied.

Figure 17:
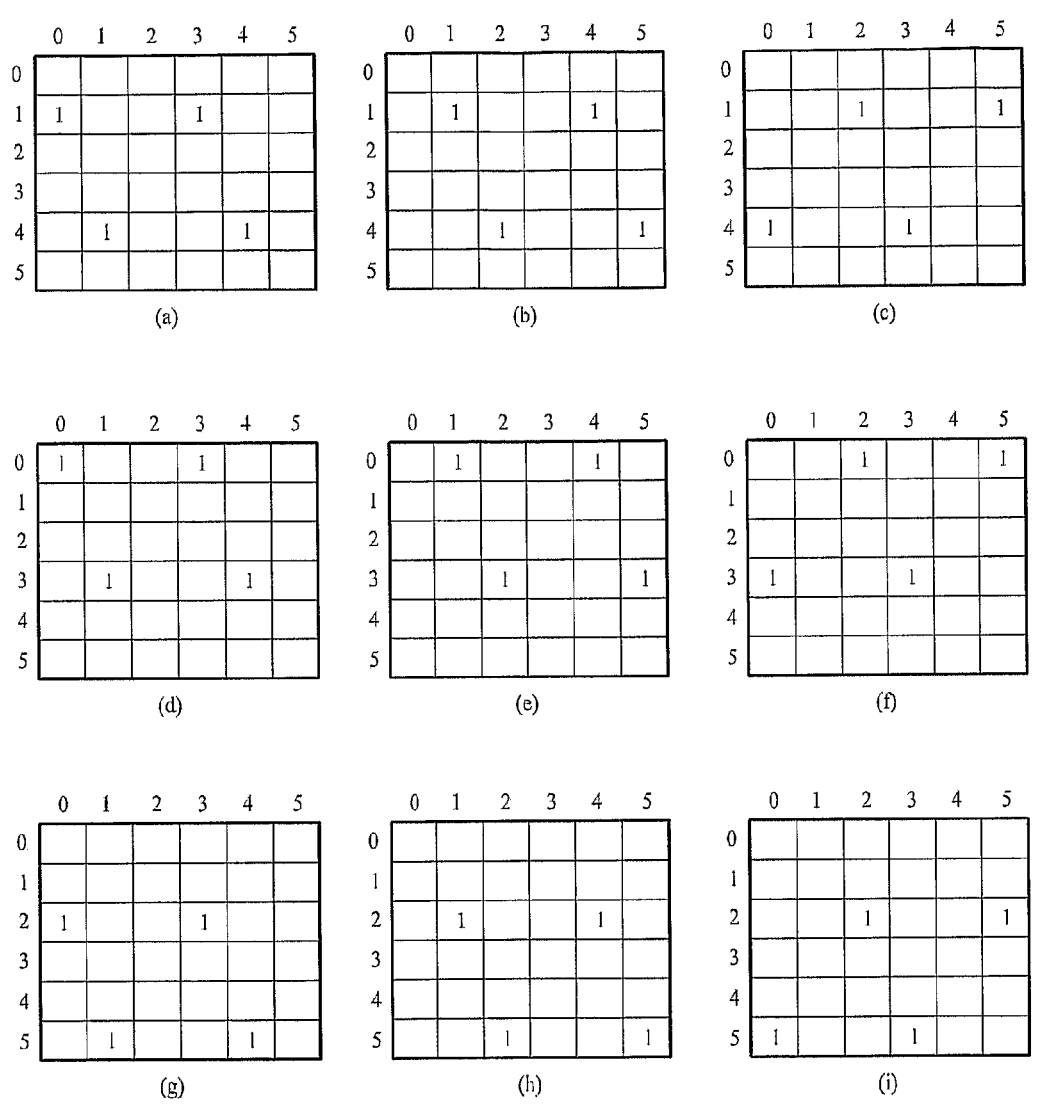

FIG. 17 illustrates an example of new pilot allocation structures generated by cyclically shifting a prescribed pilot allocation structure according to another embodiment of the present invention.

Specifically, FIG. 17 illustrates pilot allocation structures in the case where the number of transmit antennas is 1, each RB has a 6×6 structure, and the rate of pilot symbol allocation in an RB is about 11.11%. In the pilot allocation structure of FIG. 17(*a*), the pilot symbols for the first antenna can be allocated to resource elements having coordinates (0,1), (1,4), (3,1) and (4,4).

FIG. 17(*b*) illustrates a pilot allocation structure generated by cyclically shifting the pilot allocation structure of FIG. 17(*a*) to the right side by one OFDM symbol, and FIG. 17(*c*) illustrates a pilot allocation structure generated by cyclically shifting the pilot allocation structure of FIG. 17(*b*) to the right side by one OFDM symbol.

FIG. 17(*d*) illustrates a pilot allocation structure generated by cyclically shifting the pilot allocation structure of FIG. 17(*a*) to the upper side by one subcarrier, FIG. 17(*e*) illustrates a pilot allocation structure generated by cyclically shifting the pilot allocation structure of FIG. 17(*d*) to the right side by one OFDM symbol, and FIG. 17(*f*) illustrates a pilot allocation structure generated by cyclically shifting the pilot allocation structure of FIG. 17(*e*) to the right side by one OFDM symbol.

FIG. 17(*g*) illustrates a pilot allocation structure generated by cyclically shifting the pilot allocation structure of FIG. 17(*a*) to the lower side by one subcarrier, FIG. 17(*h*) illustrates a pilot allocation structure generated by cyclically shifting the pilot allocation structure of FIG. 17(*g*) to the right side by one OFDM symbol, and FIG. 17(*i*) illustrates a pilot allocation structure generated by cyclically shifting the pilot allocation structure of FIG. 17(*h*) to the right side by one OFDM symbol.

Figure 18:
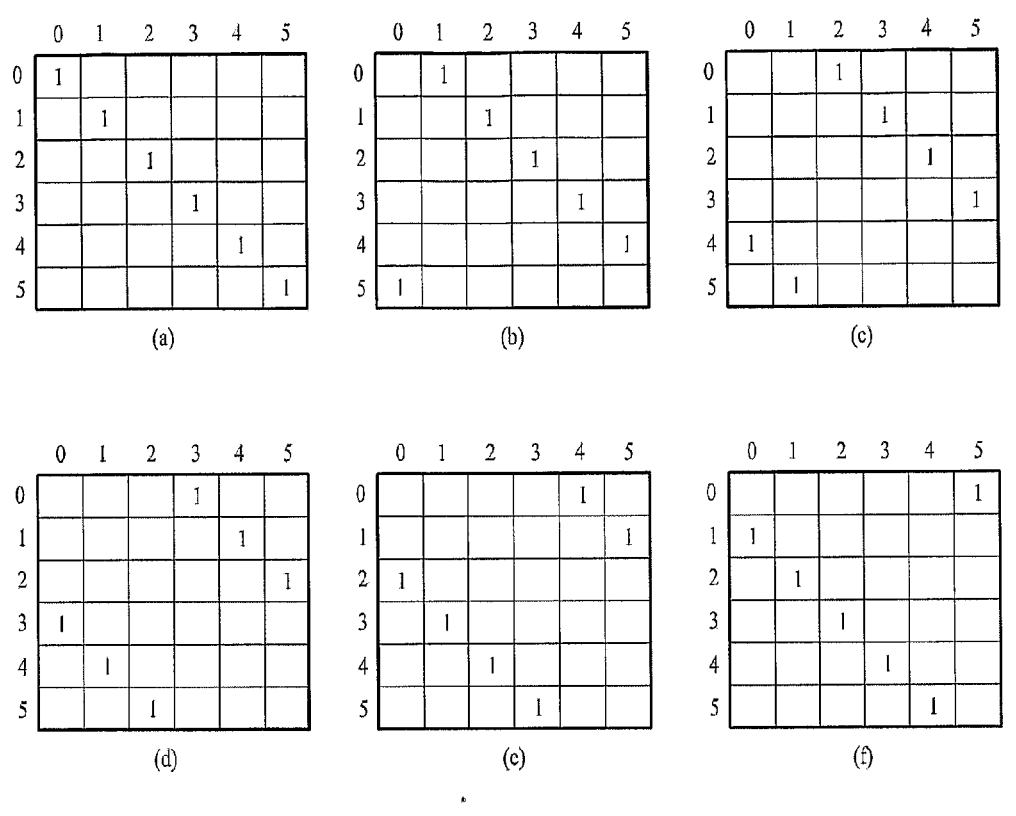

FIG. 18 illustrates another example of new pilot allocation structures generated by cyclically shifting a prescribed pilot allocation structure according to another embodiment of the present invention.

FIG. 18 illustrates pilot structures generated by cyclically shifting the pilot allocation structure of FIG. 8(*a*). The pilot allocation structure of FIG. 18(*a*) is identical to that of FIG. 8(*a*). The pilot allocation structures of FIGS. 18(*b*) to 18(*f*) are generated by cyclically shifting the pilot allocation structure of FIG. 18(a) to the right side sequentially on a 1 OFDM symbol basis.

Although pilot allocation structures that can be generated by cyclically shifting the pilot allocation structure of FIG. 8(a) on a 1 subcarrier basis are not illustrated in FIG. 18, the pilot allocation structure of FIG. 8(a) can also be cyclically shifted on the subcarrier axis on a 1 subcarrier basis.

By using the cyclically shifted pilot allocation structures of FIG. 18, interferences between neighbor base stations can be minimized when data is transmitted and received using a prescribed pilot allocation structure.

Figure 19:
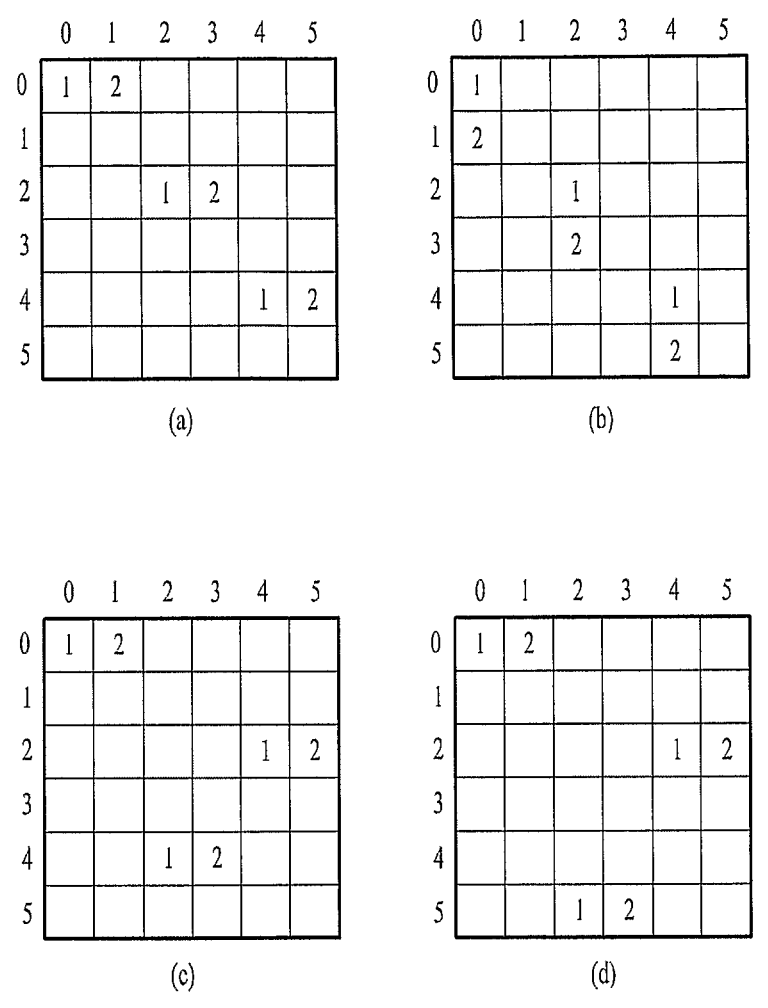

FIG. 19 illustrates still further example of new pilot allocation structures generated by cyclically shifting a prescribed pilot allocation structure according to another embodiment of the present invention.

Specifically, FIG. 19 illustrates pilot allocation structures in the case where the number of transmit antennas is 2, each RB has a 6×6 structure, and the rate of pilot symbol allocation in an RB is about 16.67%.

In the pilot allocation structure of FIG. 19(a), the pilot symbols for the first antenna can be allocated to resource elements having coordinates (0,0), (2,2), and (4,4) and the pilot symbols for the second antenna can be allocated to resource elements having coordinates (1,0), (3,2) and (5,4).

The user may cyclically shift the pilot allocation structure of FIG. 19(a) on a 2 OFDM symbol basis to generate a new pilot allocation structure. The user may also shift the pilot allocation structure of FIG. 19(a) on a 1 subcarrier basis and a 2 OFDM symbol basis.

Moreover, the user may cyclically shift the pilot allocation structure of FIG. 19(a) on a 4 OFDM symbol basis to generate a new pilot allocation structure. The user may also shift the pilot allocation structure of FIG. 19(a) on a 1 subcarrier basis and a 4 OFDM symbol basis.

In the pilot allocation structure of FIG. 19(b), the pilot symbols for the first antenna can be allocated to resource elements having coordinates (0,0), (2,2), and (4,4) and the pilot symbols for the second antenna can be allocated to resource elements having coordinates (0,1), (2,3) and (4,5).

The user may cyclically shift the pilot allocation structure of FIG. 19(b) on a 2 OFDM symbol basis or a 4 OFDM symbol basis to generate a new pilot allocation structure.

In the pilot allocation structure of FIG. 19(c), the pilot symbols for the first antenna can be allocated to resource elements having coordinates (0,0), (2,4), and (4,2) and the pilot symbols for the second antenna can be allocated to resource elements having coordinates (1,0), (3,4) and (5,2).

The user may cyclically shift the pilot allocation structure of FIG. 19(c) on a 2 OFDM symbol basis or a 4 OFDM symbol basis to generate a new pilot allocation structure. Also, the user may cyclically shift the pilot allocation structure of FIG. 19(c) on a 1 subcarrier basis or a 2 subcarrier basis to generate a new pilot allocation structure. Moreover, the user may cyclically shift the pilot allocation structure of FIG. 19(c) on a 1 subcarrier basis and 2 OFDM symbol basis to generate a new pilot allocation structure. The user may also shift the pilot allocation structure of FIG. 19(c) on a 1 subcarrier basis and a 4 OFDM symbol basis.

In the pilot allocation structure of FIG. 19(d), the pilot symbols for the first antenna can be allocated to resource elements having coordinates (0,0), (2,5), and (4,2) and the pilot symbols for the second antenna can be allocated to resource elements having coordinates (1,0), (3,5) and (5,2).

The user may cyclically shift the pilot allocation structure of FIG. 19(d) on a 2 OFDM symbol basis or a 4 OFDM symbol basis to generate a new pilot allocation structure.

Not all pilot allocation structures that can be generated by cyclically shifting the pilot allocation structure of FIG. 19(a) according to the embodiments of the present invention are illustrated in FIGS. 19(b) to 19(d). However, all pilot allocation structures that satisfy the spirit of the present invention can be obtained by cyclically shifting the allocation positions of the pilot symbols of the pilot allocation structure of FIG. 19(a) sequentially on an OFDM symbol-by-OFDM symbol basis or on a subcarrier-by-subcarrier basis.

FIG. 20 illustrates still further example of new pilot allocation structures generated by cyclically shifting a prescribed pilot allocation structure according to another embodiment of the present invention.

Specifically, FIG. 20 illustrates pilot allocation structures in the case where the number of transmit antennas is 2, each RB has a 6×6 structure, and the rate of pilot symbol allocation in an RB is about 22.22%.

In the pilot allocation structure of FIG. 20(a), the pilot symbols for the first antenna can be allocated to resource elements having coordinates (0,1), (1,4), (4,2) and (5,4) and the pilot symbols for the second antenna can be allocated to resource elements having coordinates (1,2), (1,5), (4,1) and (4,4).

The user may cyclically shift the pilot allocation structure of FIG. 20(a) to the upper side or to the lower side on a 1 or more subcarrier basis to generate a new pilot allocation structure.

In the pilot allocation structure of FIG. 20(b), the pilot symbols for the first antenna can be allocated to resource elements having coordinates (1,1), (1,4), (4,2) and (4,5) and the pilot symbols for the second antenna can be allocated to resource elements having coordinates (1,2), (1,5), (4,1) and (4,4).

The user may cyclically shift the pilot allocation structure of FIG. 20(b) to the left side or to the right side on a 1 or more OFDM symbol basis to generate new pilot allocation structures. The user may also shift each of the new pilot allocation structures to the upper side or the lower side on a 1 subcarrier basis.

The user may cyclically shift the pilot allocation structures of the embodiments of the present invention to generate new pilot allocation structures. The cyclic shift method can be used to mitigate the interferences between neighbor base stations and improve the channel estimation capabilities. Also, a pilot allocation structure generated by cyclically shifting one of the pilot allocation structures described above can be used independently.

Figure 21:
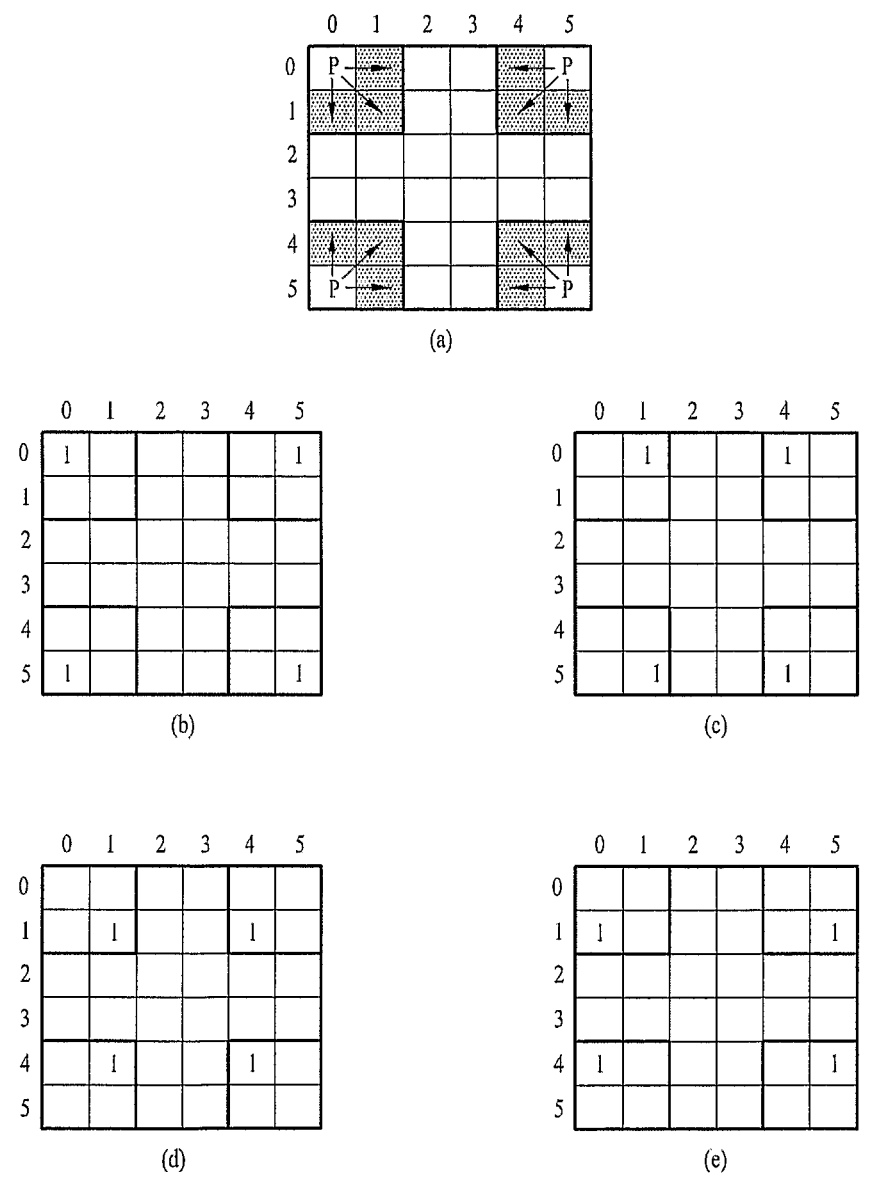

FIG. 21 illustrates an exemplary method for shifting the locations of pilot symbols used in a single-transmit-antenna structure according to still further embodiment of the present invention.

In the following, a method of cyclically shifting a pilot symbols within a specific region of an RB is described. It is preferable that the position of a pilot symbol is limited to each edge of an RB for a prescribed pilot allocation structure to improve channel estimation capabilities.

In the case where an RB has an N×M structure, it is preferable that the range of position shift does not exceed N/2 on the time axis and M/2 on the frequency axis from each edge of the RB. For example, a logical region (e.g. an RB region) has a 6×6 structure, regions for position shift which have a 2×2 structure can be established to each edge of the RB, as seen in FIG. 21(a).

FIGS. 21(b) to 21(e) illustrate exemplary pilot allocation structures that satisfy the spirit of the present invention explained with FIG. 21(a). The spirit of the present invention explained with FIG. 21(a) can be applied to all of above described FIGS. respectively.

In the pilot allocation structure of FIG. 21(b), the pilot symbols for the first antenna can be allocated to each edge of an RB which has a 6×6 structure.

FIG. 21(c) illustrates a pilot allocation structure generated by shifting the pilot allocation structure of FIG. 21(b) by one OFDM symbol from each edge and FIG. 21(d) illustrates a pilot allocation structure generated by shifting the pilot allocation structure of FIG. 21(c) by one subcarrier. FIG. 21(e) illustrates a pilot allocation structure generated by shifting the pilot allocation structure of FIG. 21(d) by one OFDM symbol. AS seen in FIGS. 21(b) to 21(e), the pilot symbols stay within the regions for position shift of FIG. 21(a).

Namely, a base station or a terminal may carry out a position shift for a reference pilot allocation structure within the corresponding region where the position shift is available. Here, the position shift can be carried out both on the time axis and the frequency axis. However, it is preferable that more than two pilot symbols are shifted. In the case where two or more pilot symbols are shifted, those pilot symbols may shift their position to anywhere in any manner as long as they stay within the regions for position shift of FIG. 21(a).

For example, if the pilot symbol which has coordinate (0,0) of FIG. 21(b) shifts to the position having coordinate (1,1), the pilot symbol should be shifted together with at least one of three remaining pilot symbols. In this case, the offset of position shift may be different each other. It is preferable that a base station or a terminal uses pilot allocation structures that may cause the least possible interferences between different cells or sectors for the pilot symbols that can be shifted.

Or, the base station or the terminal may have offsets for the position shift of reference pilot symbol. By doing so, the base station or the terminal may use pilot allocation structures that do not overlap with each other.

Or, the base station or the terminal may have a table including the offsets or indices thereof.

Or, the base station or the terminal may have coordinates for pilot symbols.

Figure 22:
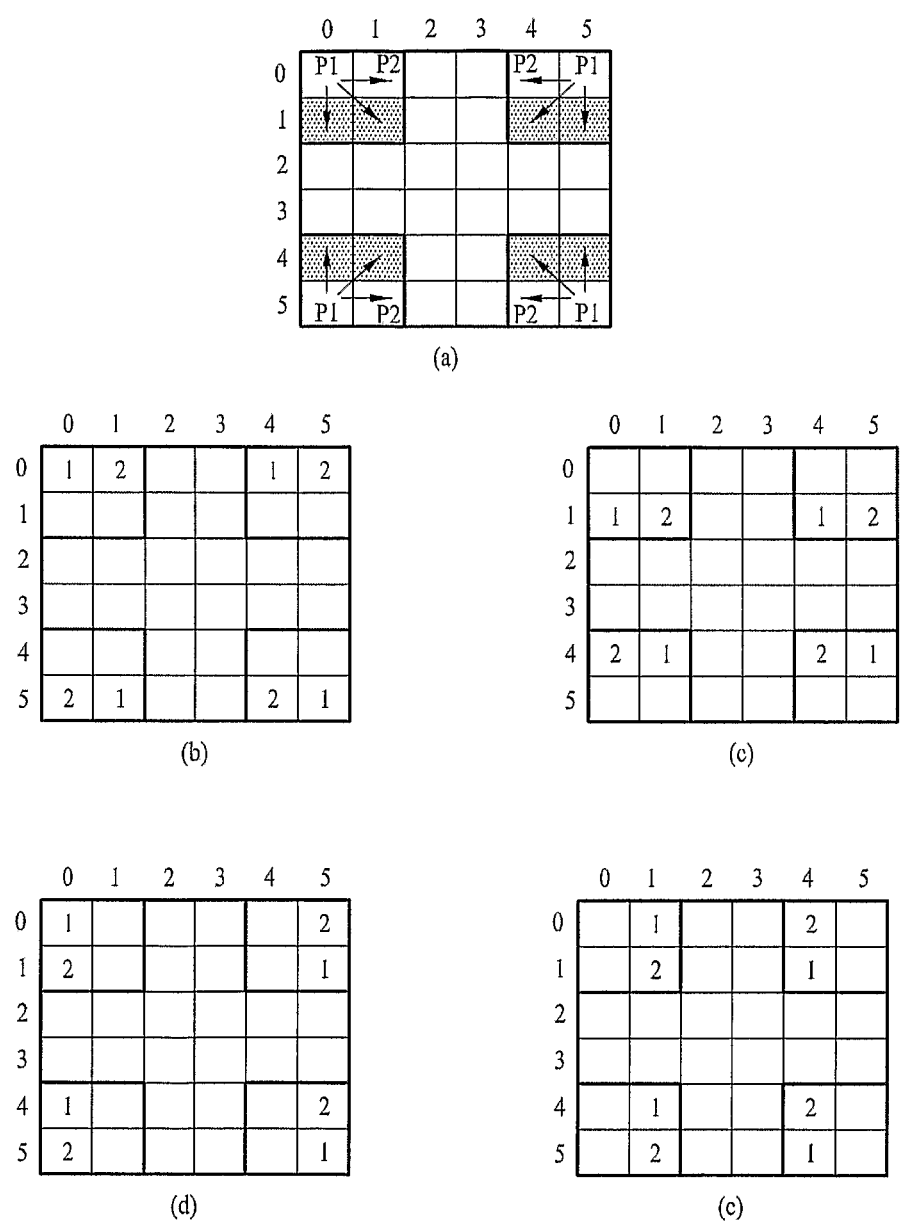

FIG. 22 illustrates an exemplary method for shifting the locations of pilot symbols used in a two-transmit-antenna structure according to still further embodiment of the present invention.

In the pilot allocation structures of FIG. 22, the similar method for shifting position of pilot symbols described with reference to FIG. 21. In particular, since each logical region of RBs for resource allocation of FIG. 22 has a 6×6 structure, a region for position shift may be established at the edge of each RB for each pilot symbol and the region may have a 2×2 structure.

A base station or a terminal may carry out a position shift for a reference pilot allocation structure within the corresponding region where the position shift is available. Here, the position shift can be carried out both on the time axis and the frequency axis. However, it is preferable that more than two pilot symbols are shifted. In the case where two or more pilot symbols are shifted, those pilot symbols may shift their position to anywhere in any manner as long as they stay within the regions for position shift of FIG. 22(a).

A base station or a terminal may use pilot allocation structures that may cause the least possible interferences between different cells or sectors for the pilot symbols which can shift their positions. Also, the base station or the terminal may have offsets for the position shift of reference pilot symbol. Moreover, the base station or the terminal may have a table including the offsets, indices for the table or coordinates for pilot symbols.

In the pilot allocation structure of FIG. 22(b), the pilot symbols for the first antenna can be allocated to resource elements having coordinates (0,0), (1,5), (4,0) and (5,5) and the pilot symbols for the second antenna can be allocated to resource elements having coordinates (0,5), (1,0), (4,5) and (5,0).

The pilot allocation structures of FIGS. 22(c) to 22(e) can be generated by shifting the positions of at least two pilot symbols of the pilot symbols of FIG. 22(b) within the regions for position shifting of FIG. 22(a).

<Pilot Allocation Structures Using the CDM Scheme>

In the following, methods of reducing pilot overhead with similar capabilities of conventional pilot allocation structures by applying orthogonal codes or phase shift codes to the above described pilot allocation structures and to the methods of allocating pilot symbols are described.

Generally, pilot division for an antenna or a terminal using spatial multiplex is carried out in the time/frequency domain. In this case, as the number of antennas or the number of terminals that are sharing resources increases, the pilot overhead also increases. If the pilot overhead is kept relatively low despite of increasing number of the antennas or the terminals, channel estimation capabilities may be deteriorated. According to the embodiments of the present invention, antennas allocating methods which enable to maintain relatively low pilot overhead with the same channel estimation capabilities for trade-off between channel estimation capabilities of pilots and the pilot overhead are provided.

The embodiments of the present invention can be applied to the pilot allocation structures using CDM scheme described below. In the embodiments of the present invention, a base station and/or a terminal may have a predetermined phase shift code set or a orthogonal code set. Accordingly, the base station and/or the terminal may differentiate pilot symbols allocated to the prescribed positions (or channel information estimated by using the pilot symbols) from others.

First, in the case where the number of physical antennas or virtual antennas is 2, pilot allocation structures using CDM scheme may be used.

For example, two users (or terminals) using 1 transmit antenna may perform collaborative SM. In this case, a distinction of users can be carried out using orthogonal codes or phase shift codes when the pilot allocation structure for 1 transmit antenna is used.

Moreover, in the case where a user (or a terminal) using 2 transmit antennas performs non-collaborative SM, a distinction of users can be carried out using orthogonal codes or phase shift codes when the pilot allocation structure for 1 transmit antenna is used.

Second, in the case where the number of physical antennas or virtual antennas is 4, pilot allocation structures using CDM scheme may be used.

Although only the cases using up to 2 transmit antennas are described in detail in the embodiments of the present invention, the cases using 4 transmit antennas that satisfy the spirit of the present invention can be included in the scope of the invention.

For example, in the case where two users (or terminals) having 2 transmit antennas perform collaborative SM, a distinction of antennas can be carried out using the pilot allocation structure and a distinction of users can be carried out using orthogonal codes or phase shift codes when the pilot allocation structure for 2 transmit antenna is used. By doing so, similar effects of using 4 antennas can be acquired with 2 antennas.

Moreover, in the case where a user (or a terminal) using 4 transmit antennas may perform non-collaborative SM, a distinction between the third antenna and the fourth antenna can be carried out using orthogonal codes or phase shift codes when the pilot allocation structure for 2 transmit antennas is used. Here, the antenna pair which can be distinguished by conventional time/frequency domain and the antenna pair that can be distinguished by codes may be changed.

<Pilot Allocation Structures Using Conjunction of Pilot Allocation with Phase Shift Pilots and the CDM Scheme>

According to the embodiments of the present invention, a phase shift code and an orthogonal code can be applied simultaneously when the pilots shift their positions in the above described pilot allocation structures.

For example, a pilot allocation structures for the case where 2 transmit antennas are used, a specific code may be used when allocating the pilot symbols for the first antenna (Tx #0) and another specific code may be used when allocating the pilot symbols for the second antenna (Tx #1).

For another example, a specific code can be used when distinguishing between cells or sectors and a phase shift allocating method can be used when distinguishing between users or antennas. Of course, a phase shift allocating method can be used when distinguishing between cells or sectors and a specific code can be used when distinguishing between users or antennas.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. In addition, claims which are not explicitly dependent on each other can be combined to provide an embodiment or new claims can be added through amendment after this application is filed.

INDUSTRIAL APPLICABILITY

The embodiments of the present invention can be applied to a variety of wireless access systems. Examples of the variety of wireless access systems include 3rd Generation Partnership Project (3GPP), 3GPP2, and/or Institute of Electrical and Electronic Engineers (IEEE) 802.xx systems. The embodiments of the present invention can be applied not only to the variety of wireless access systems but also to any technical fields to which the variety of wireless access systems are applied.

The invention claimed is:

1. A method of transmitting and receiving data in a wireless access system, the method comprising:
   transmitting data using a resource block constructed taking into consideration channel estimation capabilities and data transfer rate; and
   receiving data using the resource block,
   wherein the resource block has a 6×6 structure constructed with 6 OFDM symbols (symbol indices of 0 to 5) and 6 subcarriers (subcarrier indices of 0 to 5), and
   wherein one or more pilot symbols are allocated to prescribed OFDM symbols of a subcarrier index 1 and a subcarrier index 4 of the resource block, and first pilots and second pilots are allocated to the resource block at a predetermined allocation rate taking into consideration a number of transmit antennas, and
   wherein one of the first pilots is allocated at the subcarrier index 1 and an OFDM symbol index 0, and
   wherein one of the second pilots is allocated at the subcarrier index 4 and an OFDM symbol index 1, and
   wherein the first pilots and the second pilots are allocated alternately at an interval of 1 OFDM symbol on the subcarrier indices 1 and 4,
   wherein, for boosting power of the first pilots and the second pilots respectively, power is borrowed from at least one data symbol included in each OFDM symbol to which the first pilots and the second pilots are allocated.

2. The method according to claim 1, wherein the transmit antenna supports, as a multiple-antenna transmission scheme, at least one of Spatial Frequency Block Coding (SFBC), Spatial Time Block Coding (STBC), and Spatial Multiplexing (SM).

3. The method according to claim 2, wherein, when the transmit antenna supports SFBC, the pilots are located adjacent to each other in a frequency domain, and
   wherein, when the transmit antenna supports STBC, the pilots are located adjacent to each other in a time domain.

4. The method according to claim 1, wherein the first pilots are cyclically shifted on a prescribed OFDM symbol basis.

5. The method according to claim 1, wherein the first pilots are cyclically shifted on a prescribed subcarrier basis.

6. The method according to claim 1, wherein at least one of the pilots is allocated to each edge of the resource block.

7. The method according to claim 6, wherein the pilots perform position shift within a prescribed region located at each edge of the resource block.

8. The method according to claim 1, wherein, when the first pilots are used for a first antenna and the second pilots are used for a second antenna, the first antenna and the second antenna are discriminated using different codes.

9. The method according to claim 1, wherein, when a first user and a second user perform collaborative transmission using one or more transmit antennas, the first and second users are discriminated using different codes.

10. The method according to claim 1, wherein, when a first user and a second user perform collaborative transmission, the first user and the second user use the first pilots, and
    wherein the first user and the second user are discriminated using different codes.

11. The method according to claim 1, wherein, when a first user and a second user perform collaborative transmission using the resource block, the first pilots and the second pilots are multiplexed using different antenna indices for the first user and the second user.

12. The method according to claim 1, wherein, when a first user and a second user perform collaborative transmission using the resource block, the first pilots and the second pilots are multiplexed using both different antenna indices for the first and second users and codes for the first and second users.

* * * * *